(12) United States Patent
Katata et al.

(10) Patent No.: US 12,088,669 B2
(45) Date of Patent: Sep. 10, 2024

(54) MOVING BODY MANAGEMENT DEVICE, CONTROL METHOD, PROGRAM AND STORAGE MEDIA

(71) Applicant: PIONEER CORPORATION, Tokyo (JP)

(72) Inventors: Keiji Katata, Kawagoe (JP); Takeshi Koda, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 511 days.

(21) Appl. No.: 17/419,174

(22) PCT Filed: Dec. 23, 2019

(86) PCT No.: PCT/JP2019/050309
§ 371 (c)(1),
(2) Date: Jun. 28, 2021

(87) PCT Pub. No.: WO2020/137950
PCT Pub. Date: Jul. 2, 2020

(65) Prior Publication Data
US 2022/0109726 A1 Apr. 7, 2022

(30) Foreign Application Priority Data

Dec. 28, 2018 (JP) .................................. 2018-246488

(51) Int. Cl.
*H04L 67/12* (2022.01)
*G07C 5/00* (2006.01)
(Continued)

(52) U.S. Cl.
CPC .............. *H04L 67/12* (2013.01); *G07C 5/006* (2013.01); *G07C 5/008* (2013.01); *G07C 5/08* (2013.01); *G07C 5/10* (2013.01); *H04L 43/06* (2013.01)

(58) Field of Classification Search
CPC .......... G07C 5/006; G07C 5/008; G07C 5/08; G07C 5/10; G08G 1/0112; G08G 1/0129;
(Continued)

(56) References Cited

U.S. PATENT DOCUMENTS

| 8,788,190 B2* | 7/2014 | Funabashi | G08G 1/0967 |
| | | | 342/82 |
| 10,943,473 B2* | 3/2021 | Hori | G08G 1/0133 |

(Continued)

FOREIGN PATENT DOCUMENTS

| JP | 2006079600 A | 3/2006 |
| JP | 2009080659 A | 4/2009 |

(Continued)

OTHER PUBLICATIONS

European Patent Office, Extended European Search Report issued on the corresponding European Patent Application No. 19903895.1 on Aug. 12, 2022, in 9 pages.

*Primary Examiner* — Babar Sarwar
(74) *Attorney, Agent, or Firm* — PROCOPIO, CORY, HARGREAVES & SAVITCH LLP

(57) ABSTRACT

A moving body management device includes: a first receiving unit configured to receive a request signal (JR1) transmitted by an information management device (40); a generating unit configured to generate command information (JR2) based on the request signal (JR1); a first transmitting unit configured to transmit the command information (JR2) to a plurality of moving bodies (20); a second receiving unit configured to receive a reception result (UD2) indicating that the moving bodies (20) have successfully received the command information (JR2); a first counting unit configured to count, on a basis of the reception result (UD2), the number of the moving bodies (20) which have successfully received the command information (JR2); a third receiving unit configured to receive response information to the com- (Continued)

mand information (JR2); a second counting unit configured to count, on a basis of the response information, the number of moving bodies (20) that have transmitted the response information; and a second transmitting unit configured to moving body number information to information management device (40), the moving body number information relating to the number of the moving bodies (20) which have successfully received the command information and the number of moving bodies (20) that have transmitted the response information.

7 Claims, 19 Drawing Sheets

(51) Int. Cl.
*G07C 5/08* (2006.01)
*G07C 5/10* (2006.01)
*H04L 43/06* (2022.01)

(58) Field of Classification Search
CPC ..... G08G 1/0141; H04L 43/06; H04L 43/065; H04L 67/06; H04L 67/12; H04W 24/10; H04W 4/44
See application file for complete search history.

(56) References Cited

U.S. PATENT DOCUMENTS

| | | | | |
|---|---|---|---|---|
| 2002/0152115 | A1* | 10/2002 | Morita | G08G 1/096741 705/13 |
| 2003/0225668 | A1* | 12/2003 | Goto | G06Q 30/06 705/37 |
| 2006/0136291 | A1* | 6/2006 | Morita | H04H 40/90 340/995.13 |
| 2008/0091339 | A1* | 4/2008 | Nagase | G08G 1/20 701/532 |
| 2010/0198454 | A1* | 8/2010 | Sugawara | G08G 1/20 701/31.4 |
| 2012/0299750 | A1* | 11/2012 | Weigert | G08G 1/0112 340/934 |
| 2017/0011562 | A1* | 1/2017 | Hodges | G09B 29/007 |
| 2017/0254650 | A1* | 9/2017 | Xue | G01C 21/3641 |
| 2018/0225962 | A1* | 8/2018 | Nakamura | G08G 1/065 |
| 2019/0039545 | A1* | 2/2019 | Kumar | G05D 1/228 |
| 2020/0082710 | A1* | 3/2020 | Lang | G08G 1/0112 |
| 2020/0164891 | A1* | 5/2020 | Bender | B60W 50/0098 |
| 2021/0279975 | A1* | 9/2021 | Tsukahara | G07C 5/0841 |

FOREIGN PATENT DOCUMENTS

| | | |
|---|---|---|
| JP | 2014081872 A | 5/2014 |
| JP | 2014095987 A | 5/2014 |
| JP | 2016156973 A | 9/2016 |
| JP | 2017167898 A | 9/2017 |

* cited by examiner

FIG. 6

JOB REQUEST

VERSION INFORMATION

REQUEST IDENTIFICATION INFORMATION

ATTRIBUTE INFORMATION

DATA COLLECTION CONDITION INFORMATION

COLLECTION DATA DESIGNATION INFORMATION

Fs — STATE MANAGEMENT FLAG

Ih : TRANSMISSION HISTORY INFORMATION

| VEHICLE ID | JOB ID | ... |
|---|---|---|
| ... | ... | ... |
| ... | ... | ... |
| ... | ... | ... |
| ... | ... | ... |

FIG. 9

```
UPLOAD DATA UD1

VERSION INFORMATION

REQUEST IDENTIFICATION INFORMATION

COLLECTION DATA

NUMBER OF INACTIVE VEHICLES

NUMBER OF ACTIVE VEHICLES

TOTAL NUMBER OF ACTIVE VEHICLES

NUMBER OF DATA COLLECTION VEHICLES

⋮
```

MOVING BODY MANAGEMENT DEVICE, CONTROL METHOD, PROGRAM AND STORAGE MEDIA

CROSS-REFERENCE TO RELATED APPLICATIONS

This application is a U.S. National Stage entry of PCT Application No: PCT/JP2019/050309 filed Dec. 23, 2019, which claims priority to Japanese Patent Application No. 2018-246488 filed Dec. 28, 2018, the contents of which are incorporated herein by reference.

TECHNICAL FIELD

The present invention relates to state management techniques in data collection.

BACKGROUND TECHNIQUE

Conventionally, a technique for a server device to collect information of sensors installed in a vehicle is known. For example, Patent Reference 1 discloses a driving support device, when detecting the variation point of the partial map based on the output of the sensor installed on a moving body such as a vehicle, which transmits the change point information on the change point to a server device.

PRIOR ART REFERENCES

Patent References

Patent Reference 1: Japanese Patent Laid-Open No. 2016-156973

SUMMARY OF THE INVENTION

Problem to be Solved by the Invention

It is assumed in the future that each company providing various services related to vehicles operates its own server and specifies data to be uploaded by vehicles and collects, through a server (vehicle management server) that manages the vehicles, various information related to the vehicles required for own service provision. In such a system, the vehicle is required to recognize as a job that it should uploads the specified data when the predetermined execution condition is satisfied, and also required to execute the job when the execution condition is satisfied.

On the other hand, the data collection request generated by the server of the service company is not guaranteed to be delivered to the vehicles. When the vehicle management server is in a high load state, or when there is no vehicle to deliver the data collection request i.e., to satisfy the collection conditions, it is not delivered to the vehicles. Additionally, in such a case that the data collection request is deleted from a vehicle because of the vehicle being in a high load state, the data collection request is not appropriately executed by the vehicle. In consideration of the above, in order to accurately grasp the effectiveness and cost efficiency of data collection requests and the reliability of collection data and the like, it is necessary to properly manage the state of process that the server device instructs each vehicle to execute.

The present invention is made to solve the above issues, and a main object thereof is to provide a moving body management device capable of suitably obtaining statistical data relating to the state of the process which moving bodies are instructed to execute.

Means for Solving the Problem

One aspect of the present invention according to claim is a moving body management device including: a first receiving unit configured to receive a request signal transmitted by an information management device; a generating unit configured to generate command information based on the request signal; a first transmitting unit configured to transmit the command information to a plurality of moving bodies; a second receiving unit configured to receive a reception result indicating that the moving bodies have successfully received the command information; a first counting unit configured to count, on a basis of the reception result, the number of the moving bodies which have successfully received the command information; a third receiving unit configured to receive response information to the command information; a second counting unit configured to count, on a basis of the response information, the number of moving bodies that have transmitted the response information; and a second transmitting unit configured to transmit moving body number information to the information management device, the moving body number information relating to the number of the moving bodies which have successfully received the command information and the number of moving bodies that have transmitted the response information.

Another aspect of the present invention according to claim is control method performed by the moving body management device, the control method including: a first receiving process to receive a request signal transmitted by an information management device; a generating process to generate command information based on the request signal; a first transmitting process to transmit the command information to a plurality of moving bodies; a second receiving process to receive a reception result indicating that the moving bodies have successfully received the command information; a first counting process to count, on a basis of the reception result, the number of the moving bodies which have successfully received the command information; a third receiving process to receive response information to the command information; a second counting process to count, on a basis of the response information, the number of moving bodies that have transmitted the response information; and a second transmitting process to transmit moving body number information to the information management device, the moving body number information relating to the number of the moving bodies which have successfully received the command information and the number of moving bodies that have transmitted the response information.

BRIEF DESCRIPTION OF THE DRAWINGS

FIG. 6 illustrates an example of a data structure of a job request.

FIG. 7 illustrates an example of a data structure of transmission history information.

FIG. 9 illustrates an example of the data structure of upload data that a vehicle cloud server sends to a service cloud server based on a job request.

DETAILED DESCRIPTION OF THE PREFERRED EMBODIMENTS

Figure 1:
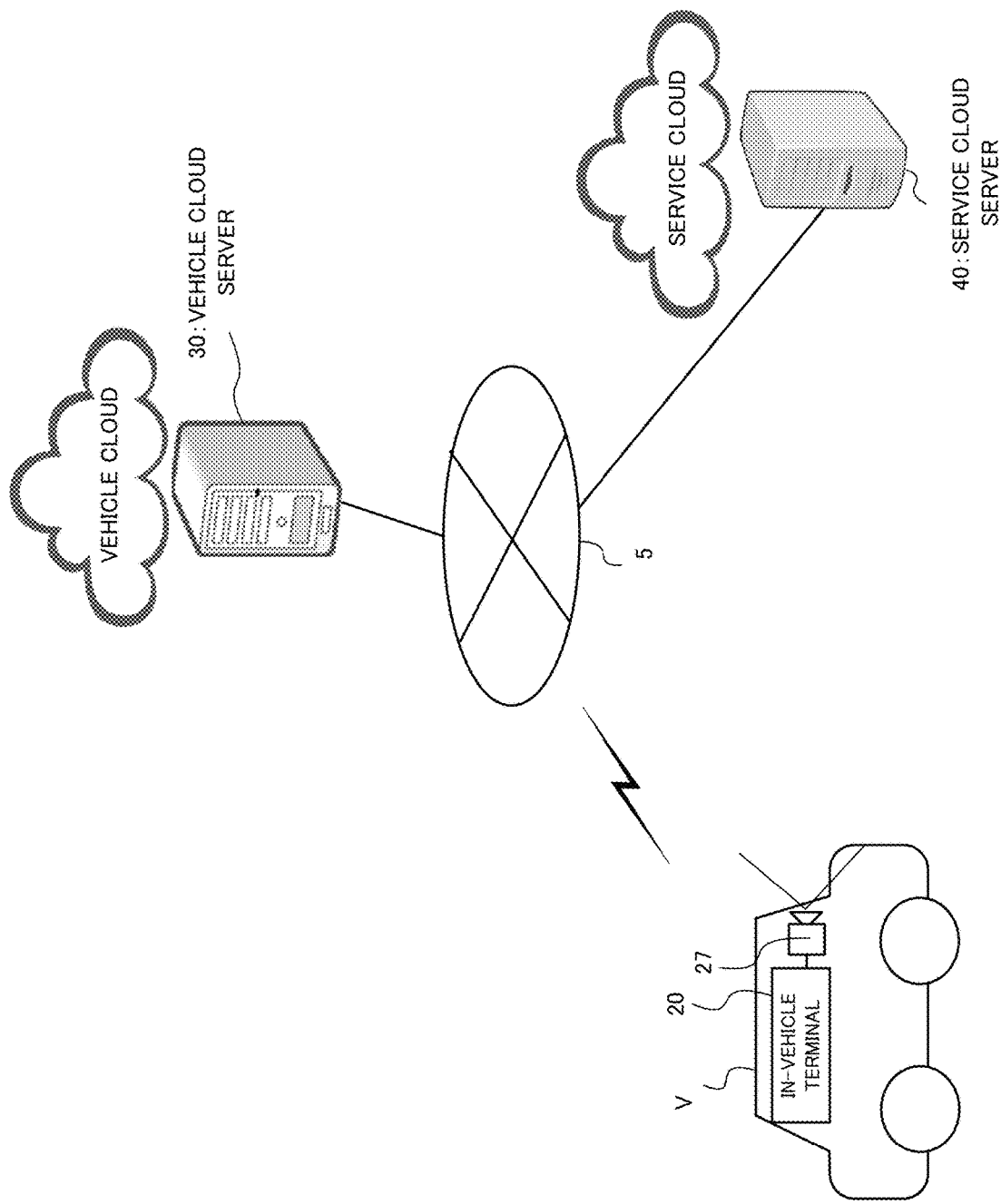
FIG. 1 illustrates the schematic configuration of the job distribution system according to the first embodiment.

One preferred embodiment is a moving body management device including: a first receiving unit configured to receive a request signal transmitted by an information management device; a generating unit configured to generate command information based on the request signal; a first transmitting unit configured to transmit the command information to a plurality of moving bodies; a second receiving unit configured to receive a reception result indicating that the moving bodies have successfully received the command information; a first counting unit configured to count, on a basis of the reception result, the number of the moving bodies which have successfully received the command information; a third receiving unit configured to receive response information to the command information; a second counting unit configured to count, on a basis of the response information, the number of moving bodies that have transmitted the response information; and a second transmitting unit configured to transmit moving body number information to the information management device, the moving body number information relating to the number of the moving bodies which have successfully received the command information and the number of moving bodies that have transmitted the response information. The terms "the number of moving bodies" may be a total (accumulated) number. According to this aspect, the moving body management device can suitably supply the information management device with the moving body number information on: the number of moving bodies which have successfully received the command information that is based on the request signal; and the number of moving bodies that have transmitted the response information as a response to the command information.

In one mode of the moving body management device, the command information includes condition information indicative of a condition in which the moving body executes a command indicated by the command information, wherein the response information includes information associated with a state of the command information, the state varying depending on whether or not the condition is satisfied. According to this mode, the moving body management device can obtain, with respect to each moving body, information associated with a state, which varies depending on whether or not the condition is satisfied, of the command information. Thereby, the moving body management device can accurately count the number of moving bodies described above.

In another mode of the moving body management device, the first transmission unit transmits the command information and flag information to the plurality of the moving bodies, the flag information instructing transmission of information relating to the state of the command information. According to this mode, the moving body management device can suitably collect information on the state of the command information from moving bodies.

In still another mode of the moving body management device, the state of the command information includes an execution state that is a state in which the condition is satisfied and the command is executed and a non-execution state that is a state in which the condition is not satisfied and the command is not executed, wherein the second transmission unit transmits, to the information management device, information, as the moving body number information, indicating a ratio of the number of the moving bodies in which the command information becomes the execution state to the number of the moving bodies which have successfully received the command information. According to this mode, the it is possible to suitably supply the information management device with information necessary to determine effectiveness and cost efficiency of the request signal.

In still another mode of the moving body management device, moving body management device further includes a memory which stores the identification information of a moving body to which the first transmitting unit transmits the command information, the identification information being associated with identification information of the command indicated by the command information. According to this mode, the moving body management device can suitably keep up with the number of the moving bodies that are destination of the command information with respect to each transmitted command information.

In still another mode of the moving body management device, the reception result includes fail information indicating that the command information was not accepted successfully. According to this mode, the moving body management device can accurately count the number of the moving bodies that has accepted the command information successfully.

Another preferred embodiment is a control method performed by the moving body management device, the control method including: a first receiving process to receive a request signal transmitted by an information management device; a generating process to generate command information based on the request signal; a first transmitting process to transmit the command information to a plurality of moving bodies; a second receiving process to receive a reception result indicating that the moving bodies have successfully received the command information; a first counting process to count, on a basis of the reception result, the number of the moving bodies which have successfully received the command information; a third receiving process to receive response information to the command information; a second counting process to count, on a basis of the response information, the number of moving bodies that have transmitted the response information; and a second transmitting process to transmit moving body number information to the information management device, the moving body number information relating to the number of the moving bodies which have successfully received the command information and the number of moving bodies that have transmitted the response information. By executing the above control method, the moving body management device can suitably supply the information management device with the moving body number information on: the number of moving bodies which have successfully received the command information that is based on the request signal; and the number of moving bodies that have transmitted the response information as a response to the command information.

Still another preferred embodiment is a program which causes a computer to perform the above-mentioned control method. By executing the program, the computer can suitably supply the information management device with the moving body number information. In some embodiments, the above program is stored on a storage medium.

Embodiments

Hereinafter, a preferred first to third embodiments of the present invention will be described with reference to the drawings.

First Embodiment (1) Overall Configuration

FIG. 1 shows a schematic configuration of a job distribution system according to a first embodiment. The job distribution system is a system for collecting various information generated by sensors of vehicles, and includes a vehicle V, a vehicle cloud server 30, and a service cloud server 40.

In the vehicle V, an in-vehicle terminal 20 is mounted. The in-vehicle terminal 20 is an information processing device which is connected to various sensors for acquiring information associated with the state or the surrounding environment of the vehicle V and which performs predetermined processing. The in-vehicle terminal 20 executes processing (simply referred to as "job") requested from the service cloud server 40 based on the output of these sensors. In the present embodiment, the job mainly refers to the process of acquiring, through sensors, information associated with the state or the surrounding environment of the vehicle V designated by the service cloud server 40 and uploading the information to the service cloud server 40. The vehicle V and the in-vehicle terminal 20 is an example of a "moving body". Further, the in-vehicle terminal 20 is an example of a "terminal device". It is noted that the "moving body" is not limited to the vehicle V and the in-vehicle terminal 20 and the "moving body" may be a moving body such as a bicycle, a wheelchair, a drone and a ship.

The vehicle cloud server 30 is a server device constituting the vehicle cloud. The vehicle cloud is, for example, a cloud operated by an information gathering company that manages vehicles (e.g., autonomous driving vehicles) provided to users and collects various types of information from the vehicles. An automobile manufacturer may play a role of the information gathering company and the information gathering company may be operated directly or indirectly by the automobile manufacturer. For example, when there are three companies A, B, and C as automobile manufacturers, an information collection companies operated by A, an information collection companies operated by B, and an information collection companies operated by C exist individually, and each information collection company collects various types of information from vehicles manufactured by an automobile manufacturer which operates the said each information collection company. Alternatively, it may be realized by such a form that a plurality of automobile manufacturers such as D, E, F companies are jointly commissioned/operated. The vehicle cloud server 30 is an example of "moving body management device".

The service cloud server 40 is a server device constitutes a service cloud. A service cloud is, for example, a cloud operated by a service provider providing services relating to vehicles. The service providers include an insurer that provides services related to insurance, a map service company that provides services related to a map, a parking lot service company that provides services related to parking lots, and a route search service company that provides services related to route search. The service cloud server 40 generates information (also referred to as "job request") for instructing a job to be executed by the in-vehicle terminal 20 depending on the purpose, and distributes the information to the in-vehicle terminal 20 through the vehicle cloud server 30. The service cloud server 40 is an example of the "information management device".

The in-vehicle terminal 20 mounted on the vehicle V, the vehicle cloud server 30, and the service cloud server 40 can perform wired or wireless communication to each other through the network 5. In this embodiment, the in-vehicle terminal 20, the vehicle cloud server 30, and the service cloud server 40 exchange job requests generated by the service cloud server 40 and data (also referred to as "upload data") generated by the in-vehicle terminal 20 in response to a job request.

The configuration of the job distribution system shown in FIG. 1 is an example, and the configuration to which the present invention can be applied is not limited thereto. For example, as the service cloud, there may be a service cloud (the first service cloud) that generates a job request and a service cloud (the second service cloud) that requests the first service cloud to collect predetermined information. In this case, for example, the first service cloud generates a job request according to the request content of the second service cloud, and transmits the information requested by the second service cloud to the second service cloud based on the upload data received from the vehicle cloud to which the job request is sent.

Figure 2:
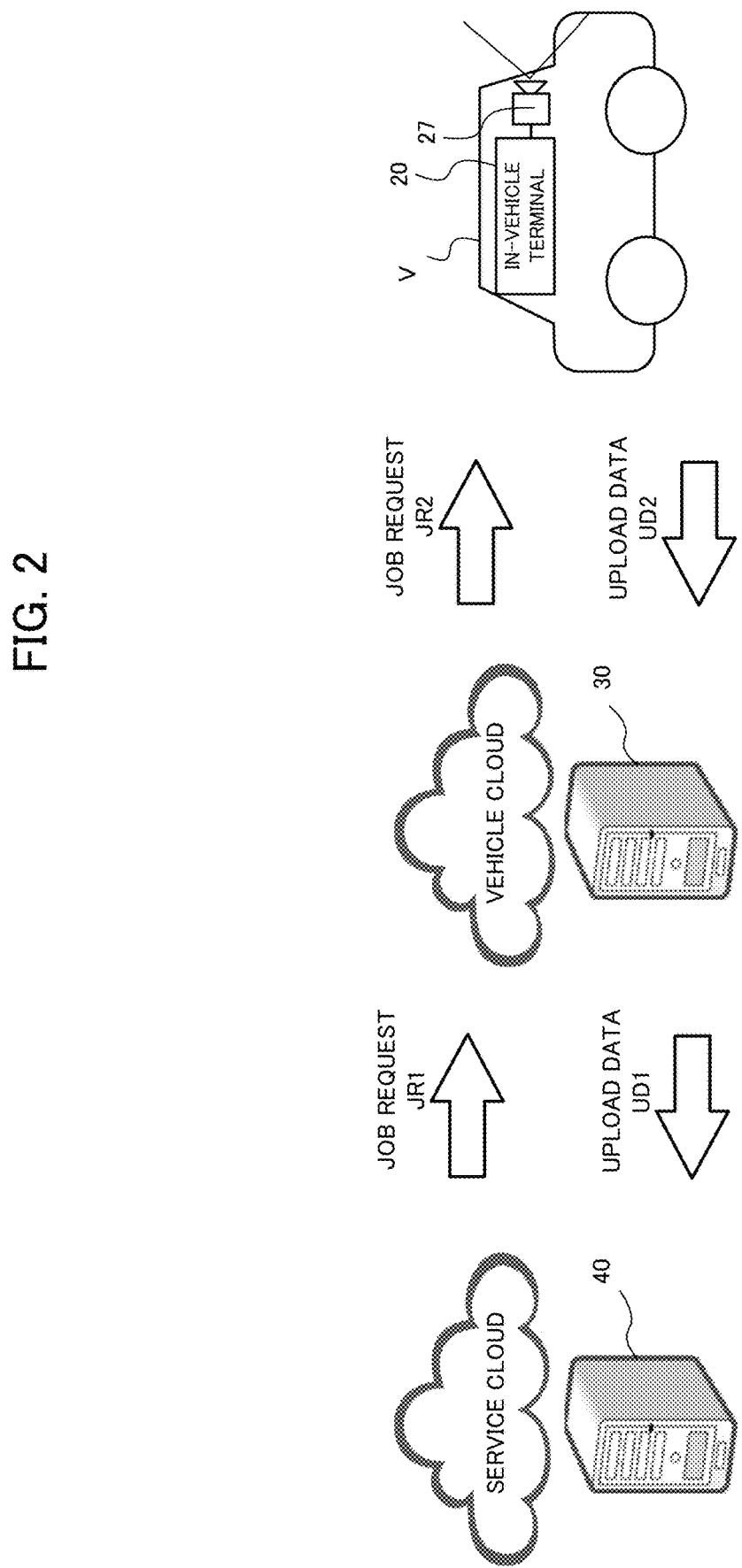
FIG. 2 is a diagram schematically showing a flow of data between an in-vehicle terminal, a vehicle cloud server, and a service cloud server.

FIG. 2 is a diagram schematically illustrating a flow of data among the in-vehicle terminal 20, the vehicle cloud server 30, and the service cloud server 40.

As illustrated in FIG. 2, the service cloud server 40 generates and transmits a job request "JR1" to the vehicle cloud server 30, and the vehicle cloud server 30 transmits a job request "JR2", which is generated based on the job request JR1 received from the service cloud server 40, to the in-vehicle terminal 20. The job request JR1 can include a vehicle ID that indicates a vehicle to be executed a job, a driver ID, and the like, and the service cloud server 40 includes the vehicle ID and the driver ID indicative of the destination in the job request JR1 as needed. Thus, the vehicle cloud server 30 transmits a job request JR2 to the in-vehicle terminal 20 of the target vehicle.

The in-vehicle terminal 20 that has received the job request JR2 collects data specified in the job request JR2 from the sensors and transmits the collection data as upload data "UD2" to the vehicle cloud server 30. When receiving an upload data UD2 from an in-vehicle terminal 20, the vehicle cloud server 30 generates upload data "UD1" based on the upload data UD2, and sends the generated upload data UD1 to the requesting service cloud server 40. The data structures of the job requests JR1 and JR2 and upload data UD1 and UD2 are described in detail in the section "(5) Data Structure". The job request JR1 transmitted by the service cloud server 40 to the vehicle cloud server 30 is an example of a "request signal," the job request JR2 transmitted from the vehicle cloud server to the in-vehicle terminal 20 is an example of "transmission information," and the upload data UD2 is an example of a "reception result."

(2) Configuration of In-vehicle Terminal

Figure 3:
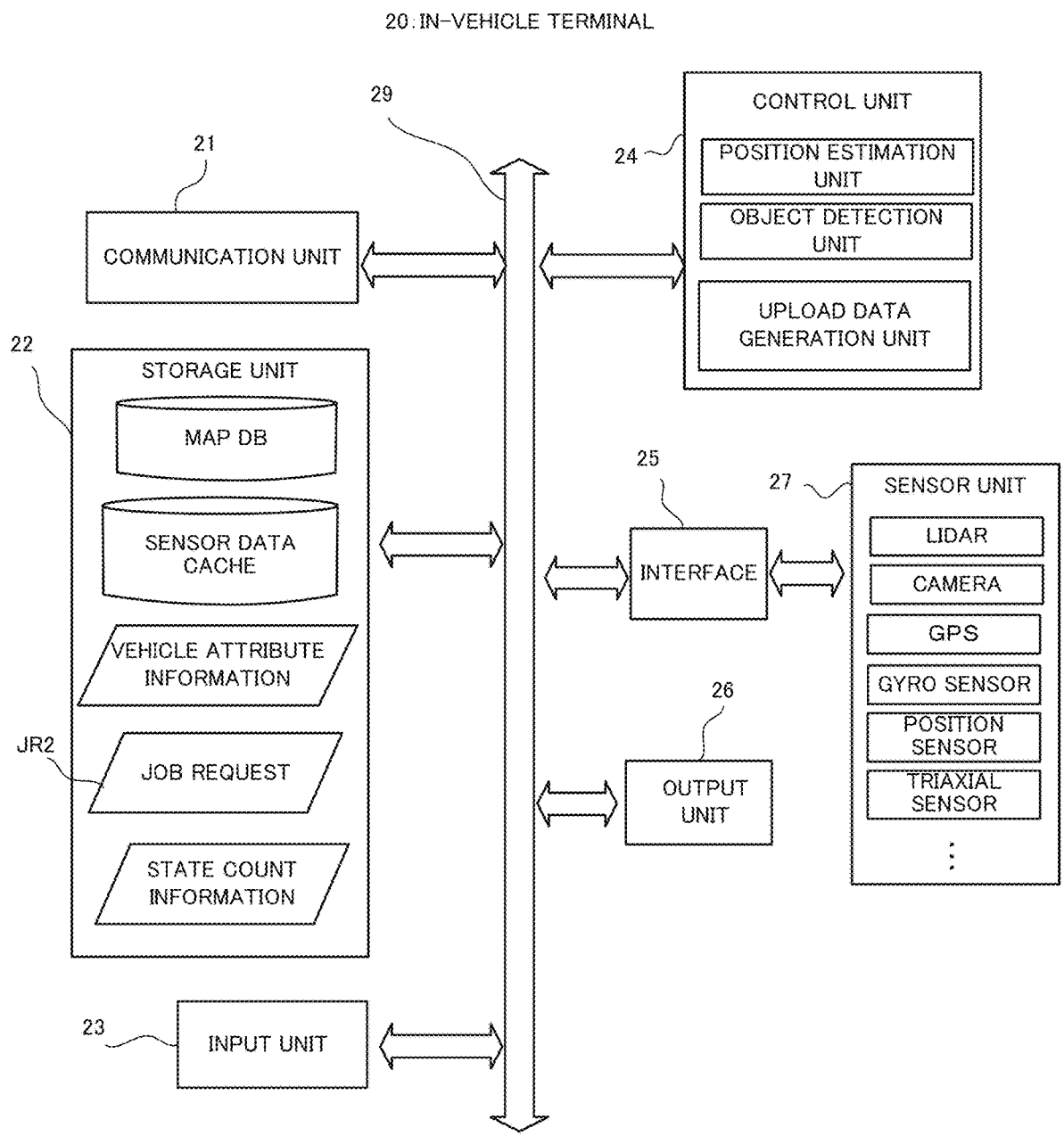
FIG. 3 is a block diagram showing an internal configuration of the in-vehicle terminal.

FIG. 3 is a block diagram showing the internal configuration of the in-vehicle terminal 20. As shown, the in-vehicle terminal 20 mainly includes a communication unit 21, a storage unit (memory) 22, an input unit 23, a control unit 24, an interface 25, and an output unit 26. Each element in the in-vehicle terminal 20 is connected to each other via a bus line 29. Further, the interface 25 is connected to the sensor unit 27.

The communication unit 21 transmits the upload data to the vehicle cloud server 30 or receives the map data for updating the map DB from the vehicle cloud server 30 under the control of the control unit 24. Further, the communication unit 21 may also perform a process of transmitting a signal for controlling the vehicle to the vehicle and a process of receiving a signal relating to the state of the vehicle from the vehicle.

The storage unit 22 stores a program the control unit 24 executes, and other information necessary for the control unit 24 to execute a predetermined process. The storage unit 22 includes a non-volatile memory (internal storage). In this embodiment, the storage unit 22 stores the map DB, the sensor data cache, the vehicle attribute information and the job request JR2 which is received from the vehicle cloud server 30 through the communication unit 21.

The map DB is a database including, for example, road data, facility data, and feature data around the road. The road data includes roadway/lane network data for route search, road shape data, traffic regulation data. The feature data includes information relating to: signboards such as a road sign; road surface signs such as a stop line; compartment lines such as a center line; and structures along roads. Further, the feature data may include high-precision point cloud information of the feature for use in the vehicle position estimation. In addition, various data necessary for position estimation may be stored in the map DB.

The sensor data cache is a cache memory for temporarily storing the output data of the sensor unit 27. The vehicle attribute information indicates information on the attributes of the vehicle V equipped with the in-vehicle terminal 20, such as a vehicle type, a vehicle ID, a vehicle size (e.g., vehicle length, vehicle width, vehicle size), fuel type of the vehicle and the like.

The state count information indicates the cumulative number of transitions for each state of the job during the period in which the job requested by the job request JR2 is valid. The state count information is, for example, information associated with the number of transitions to the state for each possible state of the job. The control unit 24, each time detecting the transition of the state described above, updates the state count information. The state transition of the job will be described later with reference to FIG. 4. The state count information is an example of "count information".

The input unit 23 is a button, a touch panel, a remote controller, a voice input device, or the like for the user to operate. The input unit 23 accepts, for example, an input for specifying a destination for the route search, an input for specifying ON or OFF of the autonomous driving operation, and supplies the generated input signal to the control unit 24. The output unit 26 is, for example, a display or a speaker or the like for outputting based on the control of the control unit 24.

The interface 25 performs an interface operation for supplying the output data of the sensor unit 27 to the control unit 24 and the sensor data cache. The sensor unit 27 includes a plurality of external sensors for recognizing the peripheral environment of the vehicle such as a lidar and a camera, and also includes a plurality of internal field sensors such as a GPS receiver, a gyro sensor, a position sensor, a triaxial sensor. The lidar discretely measures the distance to an object existing in the outside world, recognizes the surface of the object as a three-dimensional point cloud, and generates point cloud data. The camera generates image data taken from the vehicle. The position sensor is provided to detect the position of each external sensor, and the three-axis sensor is provided to detect the posture of each external sensor. The sensor unit 27 may include an external sensor and an internal sensor other than the external sensor and the internal sensor shown in FIG. 3. For example, the sensor unit 27 may include an ultrasonic sensor, an infrared sensor, a microphone, or the like as an external sensor.

The control unit 24 includes a CPU or the like for executing a predetermined program on one or more platforms, and controls the entire in-vehicle terminal 20. The control unit 24 functionally includes a position estimation unit, an object detection unit, and an upload data generation unit. The control unit 24 functions as a computer for executing a program. The control unit 24 is an example of the "generating unit" and a computer which executes a program, the communication unit 21 and the control unit 24 are examples of the "receiving unit" and the "transmitting unit".

The position estimating unit estimates the position of the own vehicle (including the posture of the vehicle) based on the map DB and the output data of the sensor unit 27 stored in the sensor data cache. The position estimating unit is capable of performing various position estimation methods.

For example, the position estimating unit executes: an own vehicle position estimation method by dead reckoning (autonomous navigation) based on the output of the autonomous positioning sensor such as a GPS receiver and a gyro sensor; an own-vehicle position estimation method by further collating (map matching) the road data of the map DB to the autonomous navigation result; and an own-vehicle position estimation method based on the output data of the external sensor such as a lidar or a camera and the position information in the feature information included in the map DB with respect to a predetermined object (landmark) existing in the circumferences. Then, the position estimating unit executes the position estimation method with the highest estimation accuracy among the currently executable position estimation methods, and supplies the vehicle position information indicative of the vehicle position or the like obtained based on the executed position estimation method to the upload data generating unit.

The object detecting unit detects a predetermined object based on point cloud information, image data, voice data, and the like output by the sensor unit 27. In this case, for example, the object detecting unit extracts feature data corresponding to the object detected by the sensor unit 27 from the map DB based on the position of the vehicle estimated by the position estimating unit. Then, the object detecting unit supplies information associated with the object detected by the sensor unit 27 to the upload data generating unit in such a case, for example, that there is a difference between the position and the shape of the object detected by the sensor unit 27 and the position and the shape of the object indicated by the feature data extracted from the map DB, or that there is no corresponding feature data in the map DB.

The upload data generating unit generates the upload data UD2 based on the own vehicle position information supplied from the position estimating unit, the object data supplied from the object detecting unit, and the output data of the sensor unit 27 supplied from the sensor data cache. In this example, the upload data generating unit generates data designated by the job request JR2 to include the data in the upload data UD2 when the condition specified by the job request JR2 stored in the storage unit 22 is satisfied. The upload data generating unit transmits the generated upload data UD2 to the vehicle cloud server 30 through the communication unit 21.

Here, a transition of the state (also referred to as "job state") of the job indicated by the job request JR2 will be described.

Figure 4:
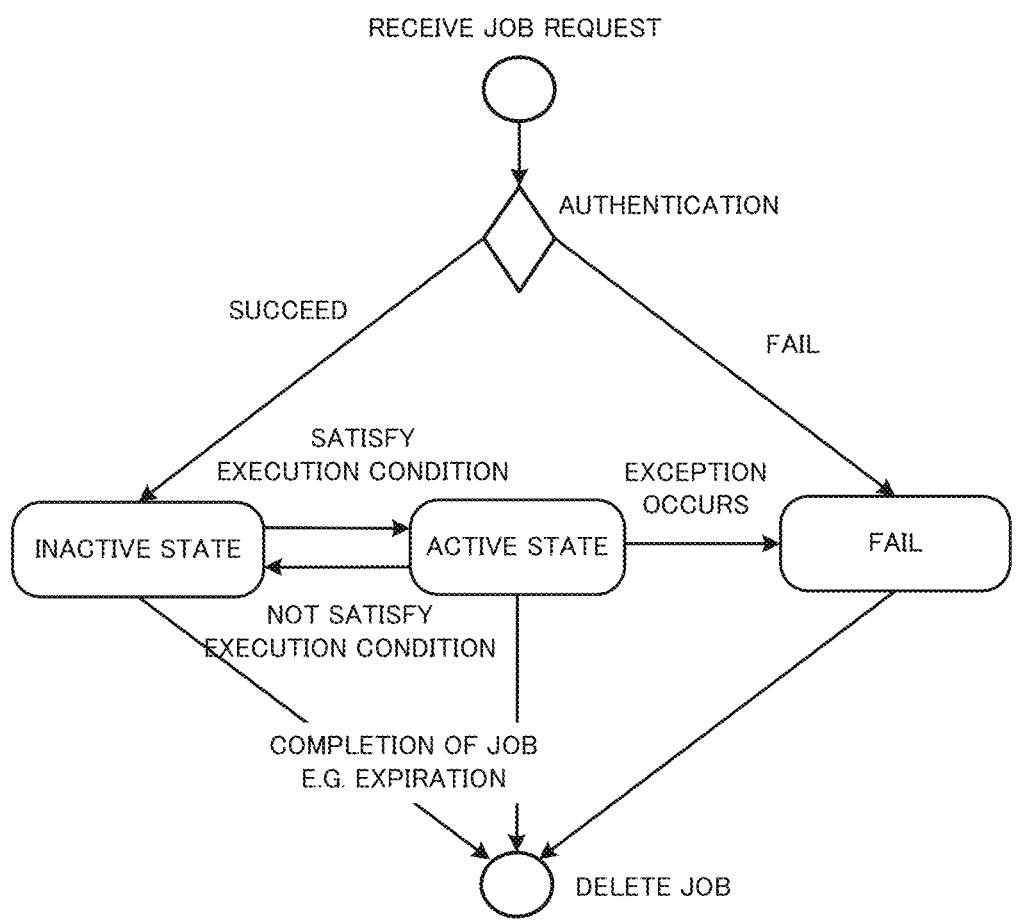
FIG. 4 schematically illustrates the state transition of the in-vehicle terminal for the job.

FIG. 4 is a diagram schematically illustrating the transition of the job state. FIG. 4 shows an inactive state that is a job state that does not satisfy the execution condition of the job indicated by the job request JR2, an active state (execution state) that is a job state that satisfies the execution condition of the job, and "fail (Failed)" that the job state transitions in exceptional cases.

When receiving the job request JR2, the in-vehicle terminal 20 performs a predetermined authentication process and determines whether or not it is appropriate to receive the job request JR2. For example, as the authentication process, the in-vehicle terminal 20 determines whether or not the vehicle ID or/and the driver ID specified in the job request JR2 coincide with the vehicle ID of the vehicle V or the driver ID of the vehicle V.

If the authentication process is successful, the job automatically transitions to the inactive state. Subsequently, when it is determined that the job execution condition indicated by the job request JR2 is satisfied, the job transits to the active state, and when it is determined that the execution condition is not satisfied after transitioning to the active state, the job transitions to the inactive state.

On the other hand, if the authentication process fails, the job goes to "fail". In this case, the in-vehicle terminal 20 transmits, to the vehicle cloud server 30, the upload data UD2 indicating that a failure has occurred. When a predetermined exception occurs, the job may be moved from the active state or the inactive state to "fail". The in-vehicle terminal 20 terminates the job when the job has expired or the job is completed or failed, and then deletes the job request JR2 from the storage unit 22. The upload data UD2 indicating that "fail" has occurred is an example of "fail information".

(3) Configuration of Vehicle Cloud Server

Figure 5A:
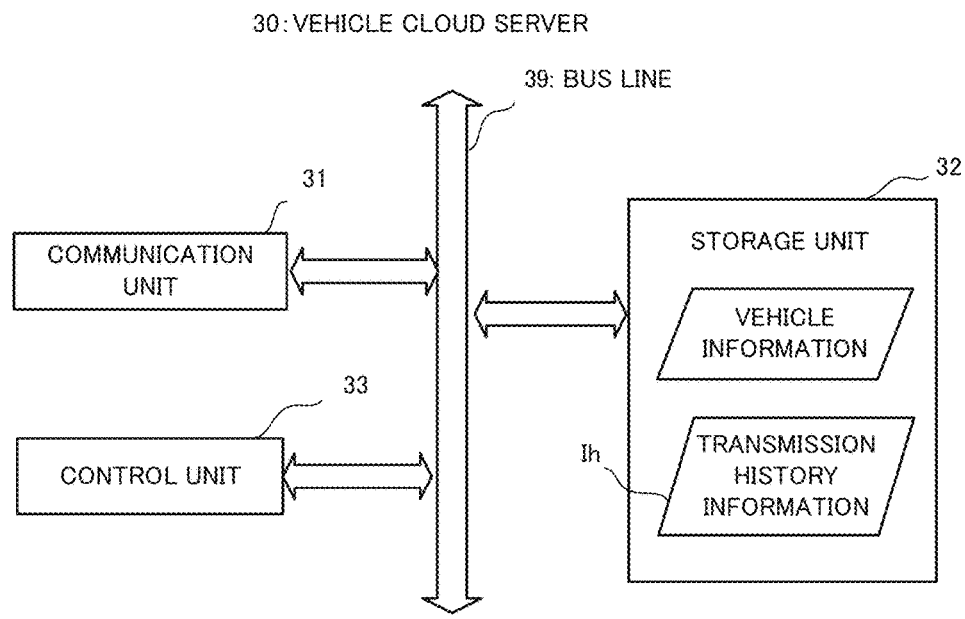
FIGS. 5A and 5B are block diagrams showing the internal configurations of the vehicle cloud server and the service cloud server.

Next, the vehicle cloud server 30 will be described in detail. FIG. 5A is a block diagram showing the internal configuration of the vehicle cloud server 30. As shown, the vehicle cloud server 30 includes a communication unit 31, a storage unit (memory) 32, and a control unit 33. Each element in the vehicle cloud server 30 is interconnected via a bus line 39.

The communication unit 31 communicates with the in-vehicle terminal 20 of the vehicle V and the service cloud server 40 based on the control of the control unit 33. Specifically, the communication unit 31 receives the job request JR1 from the service cloud server 40 or transmits the job request JR2 generated based on the job request JR1 to the in-vehicle terminal 20. The communication unit 31 receives the upload data UD2 from the in-vehicle terminal 20 or transmits the upload data UD1 generated based on the upload data UD2 to the service cloud server 40.

The storage unit 32 includes a ROM, a RAM, and the like, and stores programs for the vehicle cloud server 30 to execute various kinds of processing. The storage unit 32 is also used as a work memory when various kinds of processing are executed. Further, the storage unit 32 stores the vehicle information, and the transmission history information Ih. Vehicle information is information associated with vehicles managed by the vehicle cloud. The vehicle information is a table information in which the vehicle ID or/and the driver ID the communication address information for transmitting data to the vehicle terminal 20 of the corresponding vehicle, the information on the service the corresponding vehicle uses are associated with one another with respect to each vehicle. The transmission history information Ih is a table showing a history of sending a job request JR2 to the in-vehicle terminal 20 of each vehicle. The detailed data structure thereof will be described later.

The storage unit 32 may further store history data of: the job request JR1 received from the service cloud server 40 by the vehicle cloud server 30; and the upload data UD2 acquired from the in-vehicle terminal 20 by the vehicle cloud server 30. In this case, for example, on the storage unit 32, the upload data UD2 received from each in-vehicle terminal 20 is stored in association with the vehicle ID and the reception time of the vehicle V mounting the in-vehicle terminal 20. Similarly, the storage unit 32 may store the job request JR1 received from the service cloud server 40 in association with information specifying the service cloud server 40 as the transmission source and the reception time.

The control unit 33 includes a computer such as a CPU and controls the entire vehicle cloud server 30. Specifically, the control unit 33 performs various processes by executing various programs stored in the storage unit 32. The control unit 33 is an example of the "generating unit", the "counting unit", the "first counting unit", and the "second counting unit". Further, the communication unit 31 and the control unit 33 are an example of the "first reception unit", the "first transmission unit", the "second reception unit", the "third reception unit", and the "second transmission unit".

(4) Configuration Service Cloud Servers

Figure 5B:
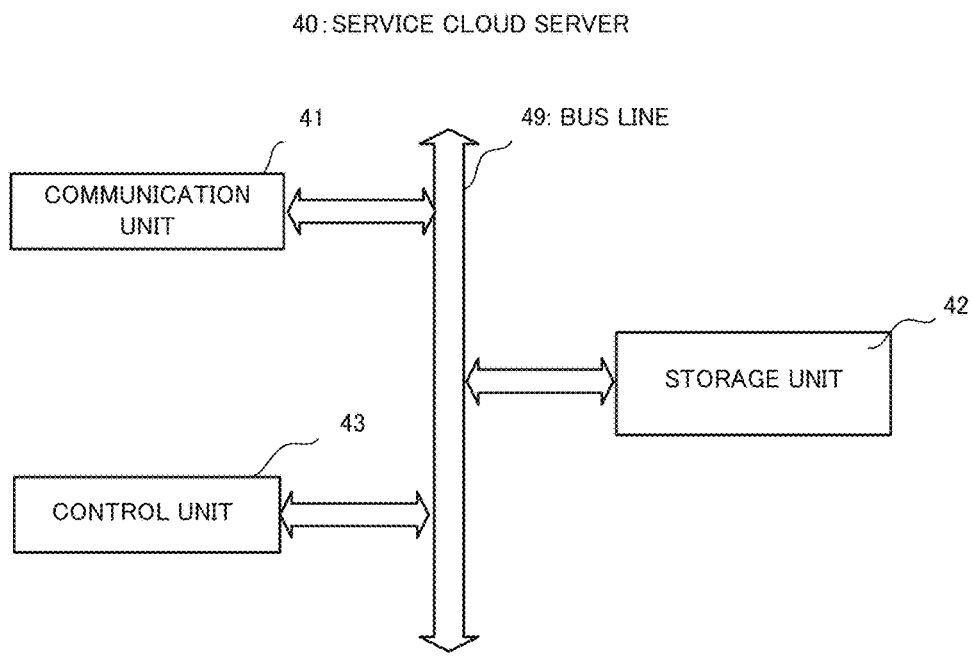

Next, the service cloud server 40 will be described in detail. FIG. 5 (B) is a block diagram illustrating an internal configuration of the service cloud server 40. As shown, the service cloud server 40 includes a communication unit 41, a storage unit 42, and a control unit 43. Each element in the service cloud server 40 is interconnected via a bus line 49.

The communication unit 41 communicates with the vehicle cloud server 30 under the control of the control unit 43. Specifically, the communication unit 41 receives information corresponding to the provided information to be described later from the vehicle cloud server 30.

The storage unit 42 includes a ROM which is a nonvolatile memory, a RAM which is a volatile memory, and the like, and stores programs for various kinds of treatment executed by the service cloud server 40. The storage unit 42 is also used as a work memory when various kinds of treatment are executed. The storage unit 42 may store a job request JR1 transmitted by the service cloud server 40 to the vehicle cloud server 30 and a history of upload data UD1 acquired from the vehicle cloud server 30 by the service cloud server 40. In this case, for example, the job request JR1 and the upload data UD1 are stored in the storage unit 42 in association with information specifying the transmission destination or the transmission source vehicle cloud server 30 and the transmission/reception time.

The control unit 43 is composed of a computer such as a CPU and controls the entire service cloud server 40. Specifically, the control unit 43, by executing various programs stored in the storage unit 42, performs various processes.

(5) Data Structure

Next, the data structure of various data will be described. Subsequently, when the job request JR1 and the job request JR2 are not distinguished, they are simply referred to as "job requests", and when the upload data UD1 and the upload data UD2 are not distinguished, they are simply referred to as "upload data".

(5-1) Job Request

FIG. 6 is an example of a data structure of a job request. As illustrated, the job request includes "version information", "request identification information", "attribute information", "data collection condition information", "state management flag" and "collection data designation information".

The "version information" is information that identifies the version or the like of the specification that specifies the job request. The "attribute information" is information that specifies the handling of the target job request.

The "request identification information" is identification information unique to the job request JR1 generated by the service cloud server 40. Each time the service cloud server 40 generates a job request JR1, it generates a unique request identification information and includes it in the job request JR1. The "request identification information" of the job request JR2 may be the same as or different from the "request identification information" of the job request JR1. In the latter case, the vehicle cloud server 30 sets the unique identification information as "request identification information" of the job request JR2 for each job request JR2 to be transmitted to the in-vehicle terminal 20. In this case, for example, the vehicle cloud server 30 stores a table or the like that associates the "request identification information" of the job request JR1 with the "request identification information" of the job request JR2 generated based on the job request JR1. In this example, the "request identification information" of the job request JR1 is used as information (job ID) for identifying the job.

The "data collection condition information" is information indicating the condition for collecting data. Examples of the "data collection condition information" include information indicating: a geographic condition in which the in-vehicle terminal 20 generates the upload data UD2; a temporal condition in which the upload data UD2 is generated; an event; a vehicle ID of the vehicle V; and/or a driver ID of the driver of the vehicle V. Here, the geographical condition for generating the upload data UD2 is a condition for specifying, for example, a road or an area for generating the upload data UD2, and the temporal condition for generating the upload data UD2 is a condition for specifying temporal constraints such as, for example, a time slot (a period of time) or an interval for generating the upload data UD2. Further, the event indicates an event or the like that triggers the generation of the upload data UD2. For example, the occurrence of a predetermined degree or more of impact (i.e., accident) or the occurrence of the sudden braking are specified as the event described above. The "data collection condition information" is an example of "condition information".

The "collection data designation information" is information specifying the collection data to be included as upload data when the job execution condition indicated by the data collection condition information is satisfied. The examples of the "collection data designation information" include: information on the acceleration and deceleration of the vehicle; information on the vehicle speed; information on the running locus of the vehicle (i.e., the vehicle positions and postures in the time series); the information on the departure and destination; the captured information by camera during a predetermined time period around the occurrence of the accident. The contents designated as the "data collection condition information" and the "collection data designation information" are arbitrarily set by the service company operated by the service cloud server 40 that generates the job request. The "data collection condition information" and the "collection data designation information" is an example of the "command information".

The "state management flag" is a flag (also called a "state management flag Fs") that specifies whether or not the state count information needs to be uploaded. For example, the state management flag Fs is either a value of "0" indicating that it is invalid or "1" indicating that it is valid, and when it is 1 (valid), it indicates that uploading of the state count information is necessary, and when it is 0 (invalid), it indicates that uploading of the state count information is unnecessary. The state management flag Fs is an example of flag information. Instead of being provided in a single field in the job request, the state management flag Fs maybe included in any of the fields of the "data collection condition information", the "attribute information", or the "collection data designation information".

Here, when a valid state management flag Fs is included in the job request JR1 transmitted from the service cloud server 40 to the vehicle cloud server 30, the vehicle cloud server 30 performs the counting of the number of vehicle count related to the job state for the job indicated by the job request JR1. The vehicle cloud server 30 transmits the aggregated result as upload data UD1 to the service cloud server 40. The data structure of the upload data UD1 including the above-described aggregation results will be described later with reference to FIG. 9.

When a valid state management flag Fs is included in the job request JR2 transmitted from the vehicle cloud server 30 to the respective in-vehicle terminals 20, the in-vehicle terminal 20 generates information required for the vehicle cloud server 30 to count the number of vehicles relating to the job state. Then, the in-vehicle terminal 20 includes the generated information in the upload data UD2 and transmits the upload data UD2 to the vehicle cloud server 30. The data structure of the upload data UD2 transmitted by the in-vehicle terminal 20 will be described later with reference to FIG. 8.

The job request may include any information other than the information shown in FIG. 6. For example, the job request may include address information specifying a destination for transmitting upload data to the service cloud server 40 or the vehicle cloud server 30 from which the job request is generated. In another example, the job request may include a job ID to identify the job in addition to the request identification information. For example, when the service cloud server 40 transmits a job request JR1 indicating a common job to a plurality of vehicle cloud servers 30, each job request JR1 may include a request identification information that differs depending on the job request JR1 and a job ID that is common to all job request JR1.

(5-2) Transmission History Information

FIG. 7 is an example of a data structure of the transmission history information Ih. The transmission history information Ih corresponds to the transmission history of the job request JR2, and in the example of FIG. 7, the transmission history information Ih includes at least the "vehicle ID" and the "job ID".

The "vehicle ID" is a vehicle ID corresponding to the in-vehicle terminal 20 that is the transmission destination of the job request JR2 sent by the vehicle cloud server 30 having the transmission history information Ih. The "job ID" is the identification information of the job requested by the job request JR2 transmitted to the in-vehicle terminal 20. For example, the vehicle cloud server 30 may record the request identification information in the job request JR1 used for generating the job request JR2 as the "job ID" of the transmission history information Ih.

Each time a job request JR2 is transmitted to the in-vehicle terminal 20, the vehicle cloud server 30 adds a record associated with the vehicle ID and the job ID to its own transmission history information Ih. The transmission history information Ih may include any item other than the vehicle ID and the job ID. For example, the transmission history information Ih may further include identification information of the service cloud that generates the job request JR1 used for generating the job request JR2 transmitted to the in-vehicle terminal 20. The identification information may be any information (e.g., a communication address, etc.) for identifying the service cloud.

When receiving the upload data UD2 indicating that the job request JR2 could not be normally accepted (that is, it transits to the "fail") from the in-vehicle terminal 20, the vehicle cloud server 30 deletes the corresponding record from the transmission history information Ih. That is, in this case, the vehicle cloud server 30 deletes, from the transmission history information Ih, the record including: the vehicle ID corresponding to the in-vehicle terminal 20 of the transmission source of the upload data UD2; and the job ID indicating the failed job. Thus, in the transmission history information Ih, only records indicating combinations of the vehicle ID of the in-vehicle terminal 20 normally received by the job request JR2 and the job ID corresponding to the job instructed by the job request JR2 are recorded.

Here, a description will be given of the use of the transmission history information Ih shown in FIG. 7. The vehicle cloud server 30 can suitably calculate the number of inactive vehicles (also referred to as "number of inactive vehicles") by referring to the transmission history information Ih.

Specifically, the vehicle cloud server 30 calculates, as the number of vehicles that transmitted the job request JR2, the number of records, in the transmission history information Ih, which include the job ID corresponding to the received job request JR1. Here, as shown in FIG. 4, since the job state is automatically set to an inactive state when the authentication process is successful, the job indicated by the job request JR2 in which the authentication process is successful in the in-vehicle terminal 20 is always set to an inactive state. When the authentication process fails and the state becomes the "fail", the upload data UD2 indicating that the failure has occurred is transmitted to the vehicle cloud server 30, and the corresponding record is deleted from the transmission history information Ih by the vehicle cloud server 30. Therefore, by referring to the transmission history information Ih and counting the number of vehicles that have transmitted the job request JR2 for each job, the vehicle cloud server 30 can suitably specify the number of vehicles (the number of inactive vehicles) for each job for which the job has been authenticated and accepted. As will be described later, the information indicative of the specified number of inactive vehicles is included in the upload data UD1 and transmitted to the service cloud server 40.

(5-3) Upload Data

Next, each data structure of the upload data UD1 and UD2 will be described in detail.

Figure 8:
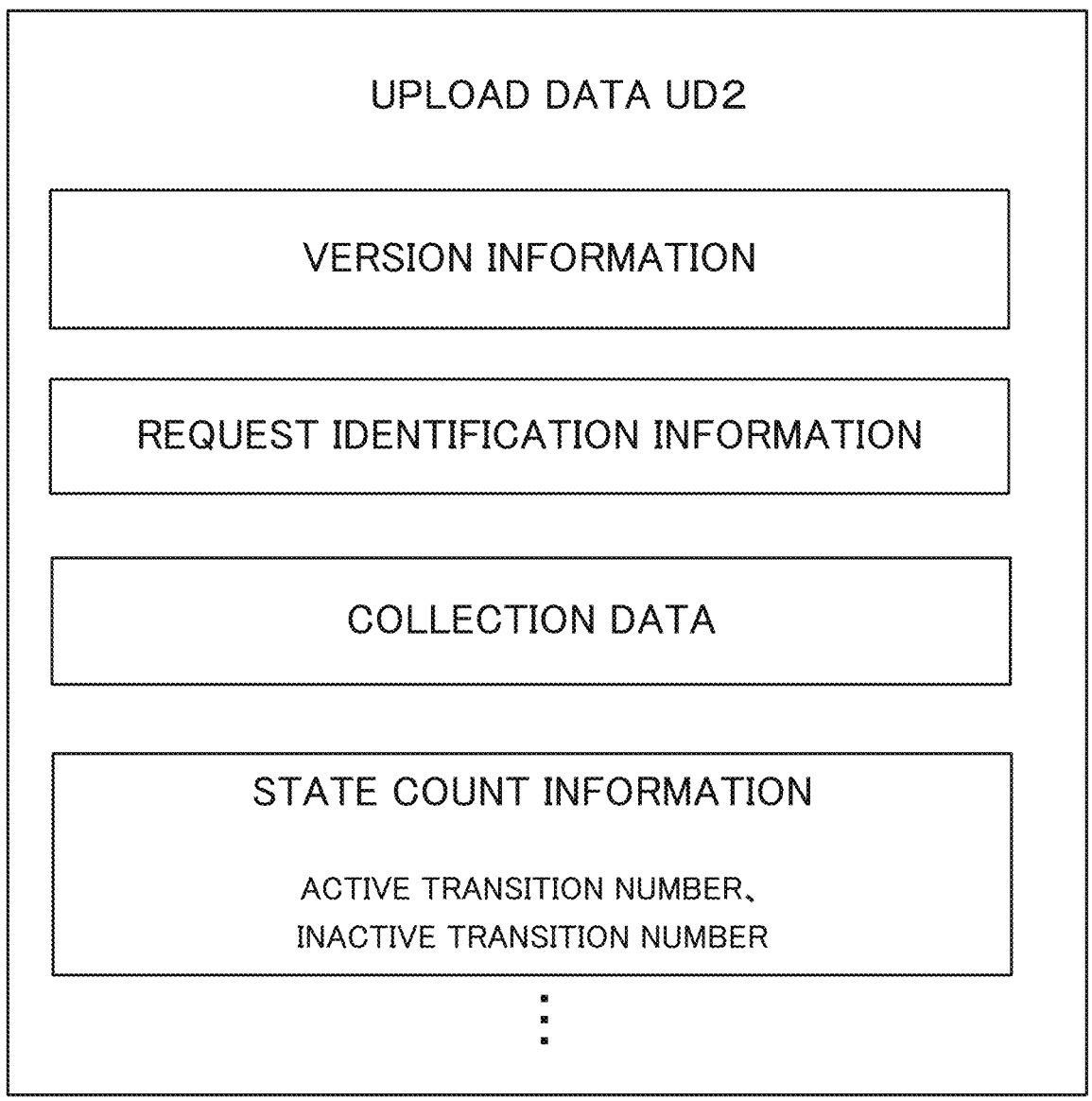
FIG. 8 illustrates an example of the data structure of upload data that an in-vehicle terminal sends to a vehicle cloud server based on a job request.

FIG. 8 is an example of a data structure of an upload data UD2 transmitted by the in-vehicle terminal 20 to the vehicle cloud server 30 based on the job request JR2. As illustrated, the upload data UD2 includes the "version information", the "request identification information", the "collection data," and the "state count information".

The "version information" is information that identifies the version of the specification that specifies the upload data UD2. For example, the same content as the "version information" included in the job request JR2 received earlier is specified in the "version information". The "request identification information" indicates the request identification information in the job request JR2 received earlier.

The "collection data" is data collected by the in-vehicle terminal 20 based on the job request JR2 received earlier, and corresponds to the result of executing the requested job. This collection data is data specified by the "collection data designation information" in the job request JR2 received earlier. The "collection data" is an example of the "response information".

The "state count information" is the state count information which the in-vehicle terminal 20 stores on the storage unit 22 based on the previously-received job request JR2, and includes the "number of active transitions" and the "number of inactive transitions". The "number of active transitions" indicates the number of times the job has transitioned to the active state (i.e., the number of active states) during the validity period of the job requested by the previously-received job request JR2. The "number of inactive transitions" indicates the number of times a job has transitioned to the inactive state (i.e., the number of inactive states) during the validity period of the job requested by the previously-received job request JR2. The "state count information" is an example of "number of times information".

Here, a supplementary description will be given of a method of generating the state count information.

When a valid state management flag Fs is included in the previously-received job request JR2, the in-vehicle terminal 20 starts counting the number of transitions of the active state and the inactive state for the target job, and stores the information on the number of transitions as the state count information on the storage unit 22. Then, the in-vehicle terminal 20 updates the state count information whenever there is a change in the job state for the target job. Then, when the upload data UD2 is generated, the in-vehicle terminal 20 includes the state count information stored on the storage unit 22 in the upload data UD2.

FIG. 9 is an example of a data structure of an upload data UD1 transmitted by the vehicle cloud server 30 to the service cloud server 40 based on the job request JR1. As shown, the upload data UD2 includes the "version information", the "request identification information", the "collection data", the "number of inactive vehicles", the "number of active vehicles", the "total (accumulated) number of active vehicles" and the "number of data collection vehicles".

The "version information" is information that identifies the version of the specification of the upload data UD1. For example, the same content as the "version information" included in the job request JR1 received earlier is specified in the "version information". The "request identification information" indicates the request identification information in the job request JR1 received earlier.

The "collection data" corresponds to the execution result of the job requested by the job request JR1, and is data specified by the "collection data designation information" in the job request JR1. The vehicle cloud server 30 transmits the job request JR2 generated based on the job request JR1 to the plurality of in-vehicle terminals 20, and receives the upload data UD2 that is the response from the in-vehicle terminals 20. Thereby, the vehicle cloud server 30 collects data to be included in the upload data UD1 as the "collection data". In this case, the vehicle cloud server 30 may include the collection data, which is included in the upload data UD2 received from each in-vehicle terminal 20, in the upload data UD1 as the "collection data". The vehicle cloud server 30 may also include the statistical data in the upload data UD1 as the "collection data", wherein the statistical data is calculated by performing predetermined statistical process on the collection data included in each upload data UD2.

The "number of inactive vehicles" is the number of vehicles in which the state of the job requested by the job request JR1 became inactive. In this embodiment, as a first example, the vehicle cloud server 30 calculates the number of inactive vehicles for the job requested by the job request JR1 by referring to the transmission history information Ih. Specifically, the vehicle cloud server 30 calculates, as the number of inactive vehicles, the number of records in which the identification information (e.g., request identification information) of the job requested by the job request JR1 is recorded as the "job ID" in the transmission history information Ih. As described above, when the in-vehicle terminal 20 that has received the job request JR2 successfully authenticates the job request JR2, the job requested by the job request JR2 is always in the inactive state, and when the authentication of the job request JR2 fails, the record (s) of the transmission history information Ih corresponding to the transmission history of the job request JR2 is deleted by the vehicle cloud server 30. Therefore, the vehicle cloud server 30 can suitably calculate the number of inactive vehicles for the job requested by the job request JR1 by referring to the transmission history information Ih. As a second example, the vehicle cloud server 30 calculates the "number of inactive vehicles" based on the state count information included in the upload data UD2. In this case, the vehicle cloud server 30 calculates, as the number of inactive vehicles for the job, the number of the in-vehicle terminals 20 that are the transmission sources of the upload data UD2 in which the number of inactive transitions indicated by the state count information described above is one or more.

The "number of active vehicles" is the number of vehicles for which the state of the job requested by the job request JR1 became active. In this example, the vehicle cloud server 30 calculates the number of active vehicles for the job requested by the job request JR1 by referring to the number of active transitions indicated by the state count information in the upload data UD2 received from each in-vehicle terminal 20 as a response of the job request JR2 generated based on the job request JR1. Specifically, the vehicle cloud server 30 calculates, as the number of active vehicles of the job, the number of the in-vehicle terminals 20 that have transmitted the upload data UD2 in which the number of active transitions of the job is one or more. As described above, the vehicle cloud server 30 can preferably calculate the number of active vehicles for the job requested by the job request JR2 by referring to the number of active transitions indicated by the state count information included in the upload data UD2 received from the in-vehicle terminals 20 that are the transmission destination of the job request JR2.

The "total number of active vehicles" is the total (accumulated) number of vehicles for which the state of the job requested by the job request JR1 became active. In this example, the vehicle cloud server 30 calculates the total number of active vehicles for the job requested by the job request JR1 by integrating the number of active transitions indicated by the state count information included in the upload data UD2 received from each in-vehicle terminal 20 as a response of the job request JR2 generated based on the job request JR1. As described above, the vehicle cloud server 30 can preferably calculate the total number of active vehicles for the job requested by the job request JR2 by referring to the number of active transitions indicated by the state count information included in the upload data UD2 received from the in-vehicle terminals 20 that are the transmission destination of the job request JR2. The number of inactive vehicles, the number of active vehicles, and the total number of active vehicles are examples of "moving body number information".

The "number of data collection vehicles" is the number of vehicles which have uploaded collection data for the job requested by the job request JR1. In the present embodiment, the vehicle cloud server 30 calculates, as the number of data collection vehicle, the number of the transmission source vehicles of the upload data UD2 with the collection data received from the in-vehicle terminals 20 as the response of the job request JR2 generated based on the job request JR1.

Next, the application of the upload data UD1 will be supplementarily described.

On the basis of the statistics of each of the numbers of the vehicles included in the upload data UD1, the service cloud server 40 that receives the upload data UD1 having the data structure shown in FIG. 9 as a response to the job request JR1 can determine the reliability of the returned collection data and determine the validity and the cost-efficiency of the data collection request.

For example, the service cloud server 40 can suitably calculate an index indicating the effectiveness or cost-efficiency of the data collection request based on the job request JR1 by generating the ratio information indicating the ratio of the number of active vehicles to the number of inactive vehicles or/and the ratio of the number of data collection vehicles to the number of inactive vehicles. For example, the service cloud server 40 can determine that the higher the ratio indicated by the ratio information is, the more effective and cost-effective the data collection request becomes. Further, the service cloud server 40 can suitably determine the reliability of collection data included in the upload data UD1 received from the vehicle cloud server 30 by referring to the number of active vehicles, the number of active total vehicles, the number of data collection vehicles, and the like. For example, the service cloud server 40 may determine that the higher the number of active vehicles, the number of active vehicles, and the number of data collection vehicles are, the higher the reliability of collection data received from the vehicle cloud server 30 becomes.

The data structure of the upload data UD1 is not limited to that shown in FIG. 9. For example, the upload data UD1 may include the total number of inactive vehicles indicating the total number of vehicles that became the inactive state. In this case, the vehicle cloud server 30 determines the above-described total number of inactive vehicles by integrating the numbers of inactive transitions indicated by the state count information included in the upload data UD1 received from the respective in-vehicle terminals 20.

(6) Processing Flow

Next, with reference to the flowcharts in FIGS. 10 and 11, a specific description will be given of the process performed by the in-vehicle terminal 20 and the vehicle cloud server 30 when the job request JR1 and the job request JR2 including the valid state management flag Fs are generated.

(6-1) Processing of In-Vehicle Terminals

Figure 10:
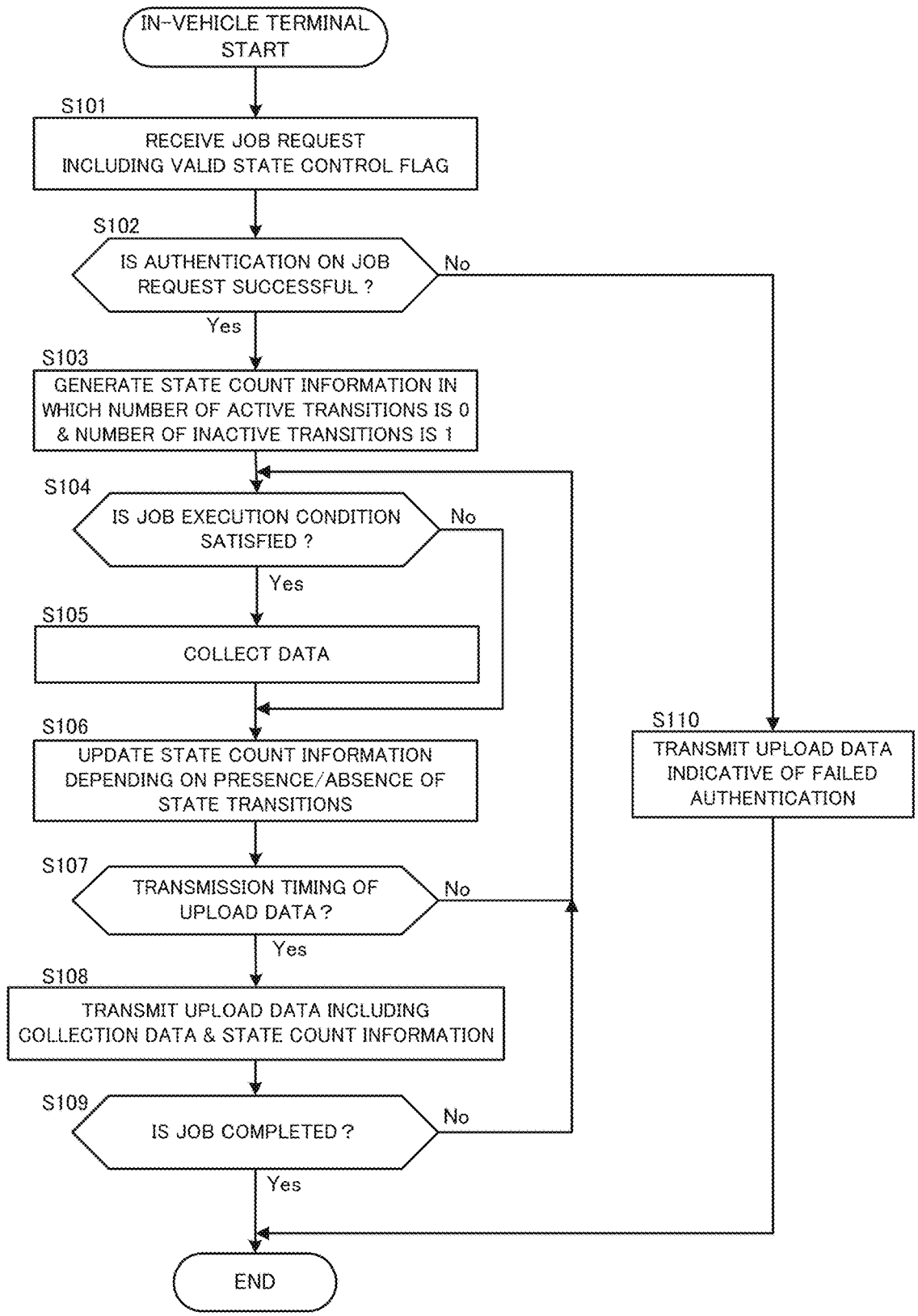
FIG. 10 is a flowchart illustrating a processing procedure executed by an in-vehicle terminal when the in-vehicle terminal receives a job request including a valid state management flag.

FIG. 10 is a flowchart illustrating a processing procedure executed by the in-vehicle terminal 20 when receiving the job request JR2 including the valid state management flag Fs. The in-vehicle terminal 20 repeatedly executes the processing of the flowchart shown in FIG. 10.

First, the in-vehicle terminal 20 receives the job request JR2 including the valid state control flag Fs from the vehicle cloud server 30 (step S101). The in-vehicle terminal 20 performs a predetermined authentication process on the job request JR2, and determines whether or not the received job request JR2 can be authenticated (step S102).

When the authentication process of the received job request JR2 is successful (Step S102: Yes), the in-vehicle terminal 20 generates the state count information for the job request JR2 because the job request JR2 includes a valid state management flag Fs (Step S103). Here, when the authentication process of the job request JR2 is successful, since the job state is automatically set to the inactive state, the in-vehicle terminal 20 generates the state count information in which the number of active transitions is set to 0 and the number of inactive transitions is set to 1.

On the other hand, when the authentication process of the received job request JR2 has failed (step S102; No), the in-vehicle terminal 20 transmits upload data UD2 indicating that the authentication has failed (that is, has become the "fail") to the vehicle cloud server 30 (step S110).

After generating the state count information at the step S103, the in-vehicle terminal 20 determines whether or not the execution condition of the job indicated by the "data collection condition information" included in the received job request JR2 is satisfied (step S104). Then, when it is determined that the execution condition of the job is satisfied (step S104; Yes), the in-vehicle terminal 20, using the data output by the sensor unit 27, performs collection of data specified by the "collection data designation information" included in the job request JR2 (step S105). In this case, the job state of the job goes to the active state. On the other hand, when it is determined that the execution condition of the job is not satisfied (step S104; No), the in-vehicle terminal 20 proceeds to step S106 without performing the process of step S105. In this case, the job state of the job is in the inactive state.

Next, the in-vehicle terminal 20 updates the state count information depending on the presence/absence of transitions in the job state (step S106). Specifically, when it is determined that the job has transitioned from the inactive state to the active state based on the determination process at the step S104, the in-vehicle terminal 20 updates the state count information so as to increase the number of active transitions for the job by one. On the other hand, when it is determined that the job has transitioned from the active state to the inactive state based on the determination process at the step S104, the in-vehicle terminal 20 updates the state count information so as to increase the number of inactive transitions for the job by one.

Next, the in-vehicle terminal 20 determines whether or not it is the transmission timing of the upload data UD2 (step S107). The transmit timing of the upload data UD2 may be determined by various rules. For example, the in-vehicle terminal 20 may transmit the upload data UD2 only once at the end of the validity period of the job, may transmit the upload data UD2 each time the data is collected at the step S105, or may transmit the upload data UD2 at a predetermined time interval. The transmission timing of the specific upload data UD2 is set to, for example, a timing specified by the data collection condition information included in the job request JR2 received from the vehicle cloud server 30.

When it is the transmission timing of the upload data UD2 (step S107; Yes), the in-vehicle terminal 20 transmits the upload data UD2 (see FIG. 8) including the collection data and the state count information indicating the number of times of inactive transition and the number of times of active transition collected at step S105 to the vehicle cloud server 30 (step S108). When the mode of transmitting the upload data UD2 at a plurality of timings is adopted, the in-vehicle terminal 20 may include the state count information only in the upload data UD2 to be transmitted at the last transmission timing. In addition, in order to include the final active transition count and the final inactive transition count during the valid period of the job in the upload data UD2, the in-vehicle terminal 20 may transmit the upload data UD2 including at least the state count information at the end of the expiration period of the job to the vehicle cloud server 30. The upload data UD2 in this situation may not include the collection data. That is, in this case, the in-vehicle terminal 20 may not necessarily match the transmission timing of the collection data with the transmission timing of the state count information.

Next, the in-vehicle terminal 20 determines whether or not the job is completed (step S109). For example, if the "data collection condition information" included in the received job request JR2 indicates the expiration date of the job, it is determined whether or not the expiration date of the job has expired. Then, when it is determined that the job is completed (step S109; Yes), the in-vehicle terminal 20 ends the process of the flowchart. On the other hand, when it is determined that it is not the transmission timing of the upload data UD2 (step S107; No), or when it is determined that the job has not been completed (step S109; No), the in-vehicle terminal 20 returns the process to the step S104.

(6-2) Process by Vehicle Cloud Server

Figure 11:
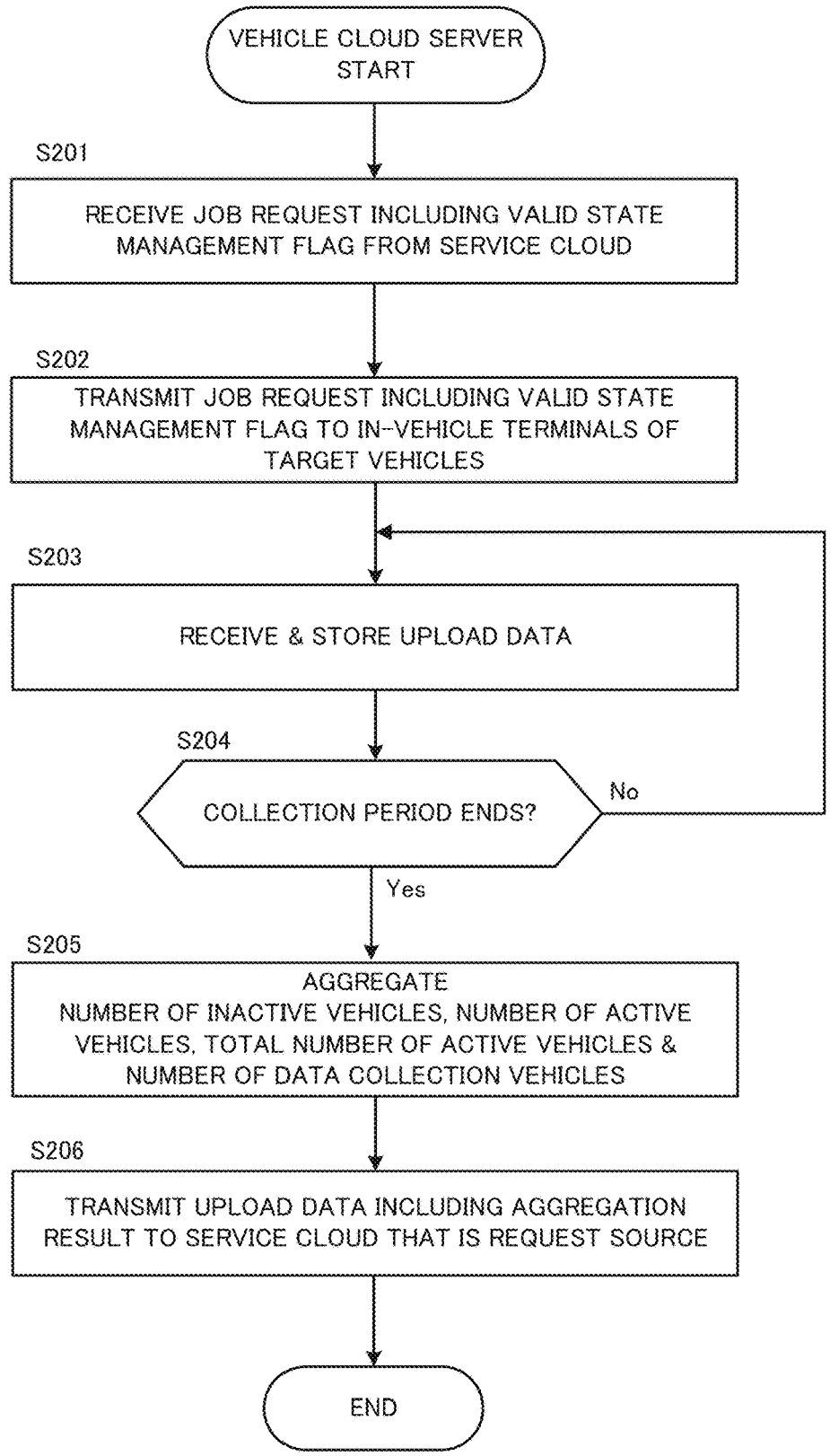
FIG. 11 is a flowchart illustrating a processing procedure performed by a vehicle cloud server that has received a job request containing a valid state management flag.

FIG. 11 illustrates a flowchart illustrating a processing procedure performed by the vehicle cloud server 30 that has received a job request JR1 including a valid state management flag Fs.

First, the vehicle cloud server 30 receives a job request JR1 containing a valid state management flag Fs from the service cloud server 40 (step S201). Then, the vehicle cloud server 30 refers to the vehicle information stored on the storage unit 32 and transmits the job request JR2 generated based on the job request JR1 to the in-vehicle terminals 20 of vehicles managed by the vehicle cloud server 30 (step S202).

After that, the vehicle cloud server 30 receives the upload data UD2 from the in-vehicle terminal 20 that is the destination of the job request to JR2, and stores it on the storage unit 32 (step S203). Then, the vehicle cloud server 30 repeatedly receives and stores the upload data UD2 according to step S203 while step S204 is No, i.e., until the predetermined collection period of the upload data UD2 ends. Thus, the vehicle cloud server 30 stores the upload data UD2 supplied from the in-vehicle terminals 20 of the plurality of vehicles.

Further, as a mode not shown in the flowchart, for example, with regard to information that requires a certain degree of real-time performance, the vehicle cloud server 30 may sequentially transmit the upload data UD1 to the service cloud server 40 as it is without storing the upload data UD2 periodically or intermittently received on the storage unit 32 within the collection period of the upload data UD2. In this case, after the collection period of the upload data UD2 ends, the vehicle cloud server 30 transmits only the state count information aggregated at the step S205 described later to the service cloud server 40.

Then, when it is determined that the collection period of the upload data UD2 has ended (step S204; Yes), the vehicle cloud server 30 performs the counting of the number of inactive vehicles, the number of active vehicles, the total number of active vehicles, the number of data collection vehicles and the like (step S205). For example, the vehicle cloud server 30 calculates the number of active vehicles and the total number of active vehicles based on the number of active transitions indicated by the state count information included in the upload data UD2 received and stored at the step S203. Further, the vehicle cloud server 30 calculates the number of inactive vehicles based on either the transmission history information Ih or the number of inactive transitions indicated by the state count information. Further, the vehicle cloud server 30 calculates the number of data collection vehicles by counting the in-vehicle terminals 20 that are the transmission sources of the upload data UD2 including the collection data. When the upload data UD2 related to the same job from the same in-vehicle terminal 20 is received more than once, the vehicle cloud server 30 may perform the above-described aggregation based on the state count information included in the last-received upload data UD2.

Next, the vehicle cloud server 30 transmits the upload data UD1 (see FIG. 9) including the aggregated result at the step S205 to the service cloud server 40 that is the request source of the job request JR1 (step S206). Subsequently, the service cloud server 40 that generated the job request JR1 receives the upload data UD1 from the vehicle cloud server 30. In this case, on the basis of the received upload data UD1, the service cloud server 40 determines the reliability of the returned collection data, determines the validity of the data collection request, and determines the cost-efficiency.

(7) Application Example

Next, a description will be given of an application example according to the present embodiment. Here, a description will be given of an example in which local government such as municipalities use a job distribution system to grasp traffic jam information and road usage conditions in detail as part of urban development and road use analysis.

Figure 12:
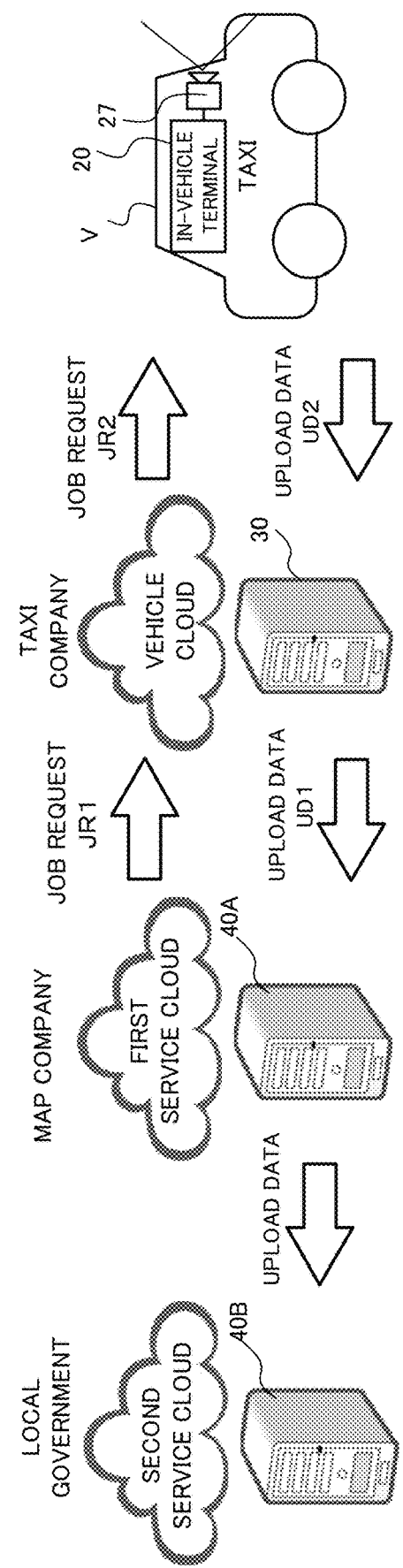
FIG. 12 illustrates the configuration example of a job distribution system in an application example.

FIG. 12 illustrates a configuration example of a job distribution system in this application example. The job distribution system shown in FIG. 12 includes a first service cloud server 4 OA operated by a map company, a second service cloud server 40B operated by a local government, a vehicle cloud server 30 operated by a taxi company, and a taxi vehicle V on which the in-vehicle terminal 20 is mounted. Here, the first service cloud server 40A functions as the service cloud server 40 according to the embodiment, and the second service cloud server 40B receives data collected by the first service cloud server 40A from the first service cloud server 40A.

There are two railway stations (A station and B station) in the area of local government, and since the streets in front of each station are congested, expansion of the streets in front of each station is required, and in order to systematically expand the streets in front of the station, traffic jam data is obtained. Taxi vehicle V is a vehicle that runs frequently in front of the station streets of two railway stations, and there are a total of 80 vehicles. In addition, each station has a taxi pool.

Figure 13:
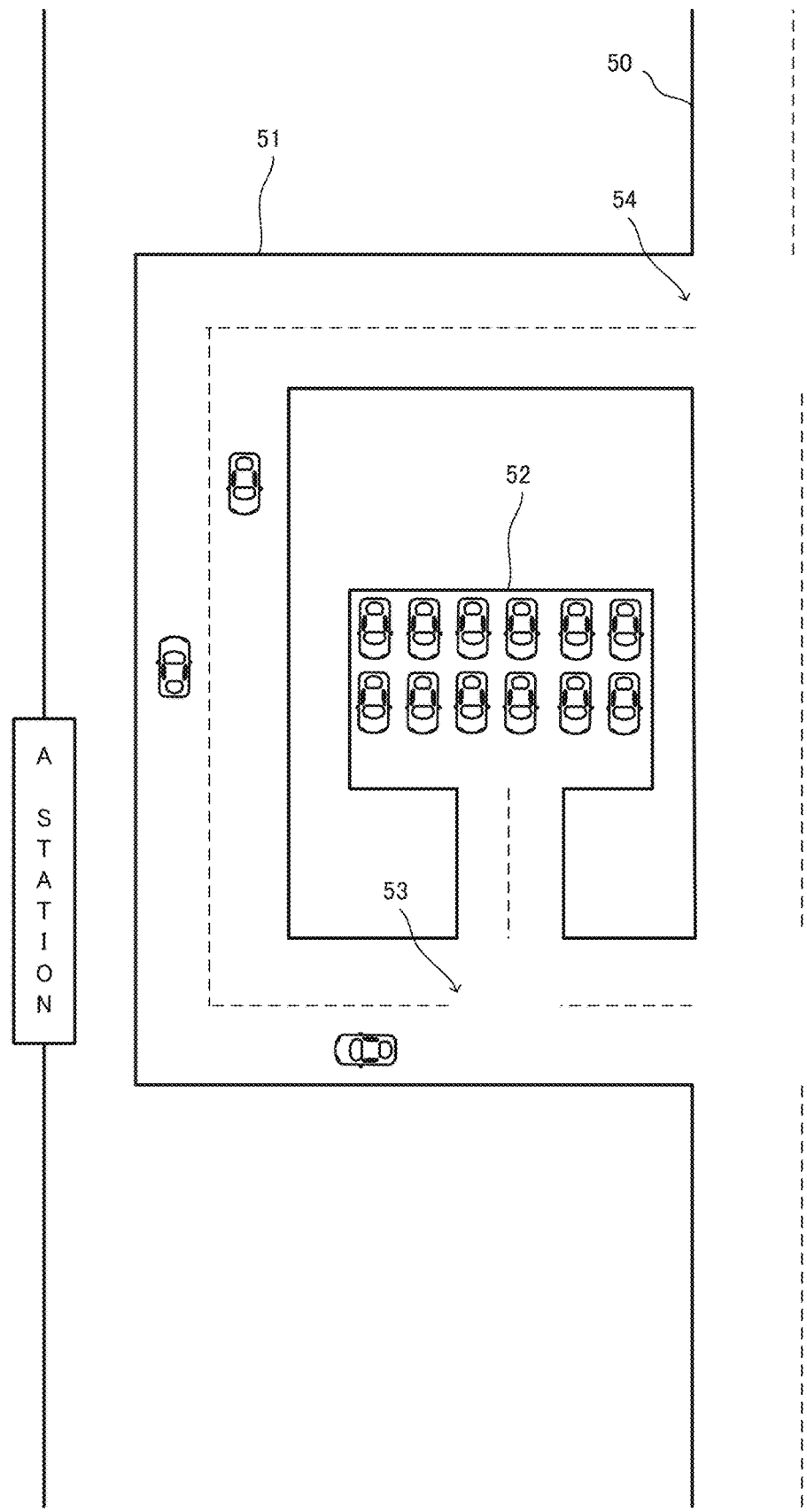
FIG. 13 is a bird's-eye view showing the front street of Station A.

FIG. 13 is an overhead view showing the front street of the station A. As shown in the figure, there is a main road 50, a road in front of the station 51 branched from the main road 50, and a taxi pool 52 that can lead to the road in front of the station 51 near the station. In the station front road 51, there is an intersection 53 leading to the taxi pool 52 and an intersection 54 serving as an entrance to the main road 50.

Here, the first service cloud server 40A generates, as the "collection data designation information" shown in FIG. 6, a job request JR1 specifying: the traveling time and the stopping (stop) time when passing through the front road 51 of the station from the intersection 53 to the intersection 54 from the taxi pool 52; and the traveling time and the stopping time until entering the taxi pool 52 from the intersection 54. This job request JR1 further includes "data collection condition information" (see FIG. 6), which defines the expiration date of the job corresponding to a week from the next Monday to Sunday, and also defines the execution time slot of the job from 6:00 a.m. to 7:00 p.m. The first service cloud server 40A calculates the average running time and the average stopping time with respect to each time zone divided into 10-minute intervals based on the upload data UD1 received from the vehicle cloud server 30 as a response to the job request JR1. The first service cloud server 40A transmits the calculated average traveling time and average stopping time as upload data to the second service cloud server 40B. In this case, the second service cloud server 40B examines the content of the traffic jam information based on the upload data received from the first service cloud server 40A. The first service cloud server 40A also calculates the average traveling time and the average residence time related to the roads in front of the station on the basis of the upload data UD1 received from the vehicle cloud server 30, and transmits the upload data including the calculation result to the second service cloud server 40B.

In such a case, by including the valid state management flag Fs in the job request JR1, the first service cloud server 40A receives statistical data of the number of vehicles related to the job state and the like from the vehicle cloud server 30 through the upload data UD1 and supplies it to the second service cloud server 40B. As a result, the second service cloud server 40B can consider statistical data on the number of vehicles related to the job state when examining the content of information on the traffic jam in front of each station, so that it can accurately examine traffic jam information. It is also possible to infer that such a time slot that there is no or very small number of measurement vehicles (i.e., very few active vehicles) is possibly a time slot that there was no inflow of taxis to the station road in front of the station due to severe traffic jam, or a time slot that there was no demand for taxis (i.e., a time slot when many taxi vehicles V waited in the taxi pool). On the basis of the collection data and the statistical data of the number of vehicles mentioned above, the local government will consult with taxi companies, etc. as necessary, and adjust the conditions for obtaining traffic jam information and the analysis method.

Second Embodiment

Instead of transmitting the state count information indicating the number of transitions to each job state to the vehicle cloud server 30, the in-vehicle terminal 20 according to the second embodiment transmits the history information (also referred to as "state history information") related to the transition of the job state to the vehicle cloud server 30. Hereafter, the configuration of the vehicle cloud server 30 and the service cloud server 40, the data structure of the job requests JR1 and JR2, the data structure of the upload data UD1 and the like are the same as those of the first embodiment, and thus will not be described.

Figure 14:
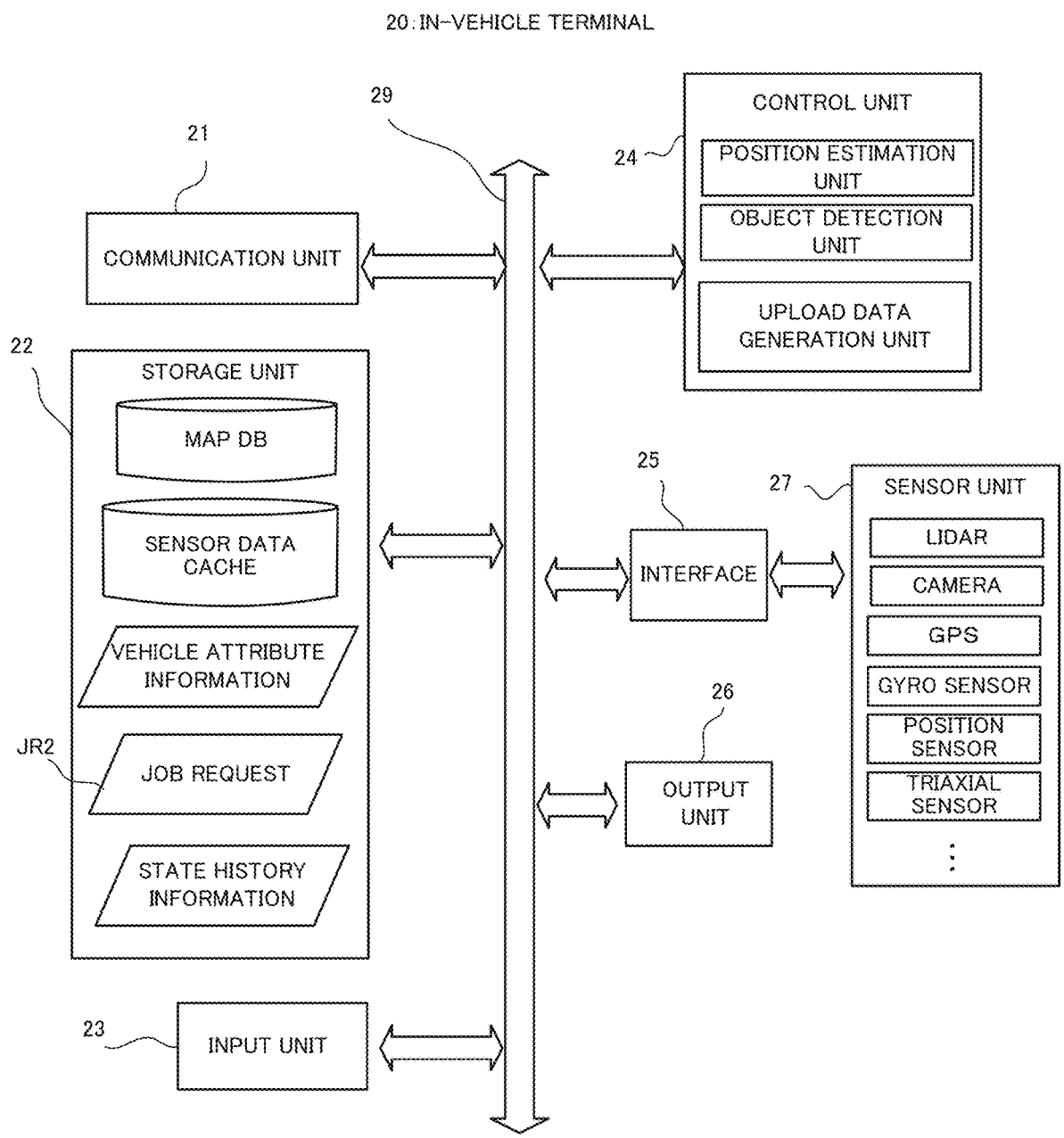
FIG. 14 is a block diagram showing the internal configuration of an in-vehicle terminal according to the second embodiment.

FIG. 14 is a block diagram showing an internal configuration of the in-vehicle terminal 20 according to the second embodiment. As shown, the storage unit 22 of the in-vehicle terminal 20 stores the state history information. The state history information is the history information on the state transition of the job during the period in which the job requested by the job request JR2 is valid. The state history information is, for example, table information which associates a state of the job after the transition and the transition time for each requested job (e.g., for each request identification information). When the valid state management flag Fs is included in the already-received job request JR2, the in-vehicle terminal 20 stores the transition of the job state for the target job on the storage unit 22 as the state history information.

Figure 15:
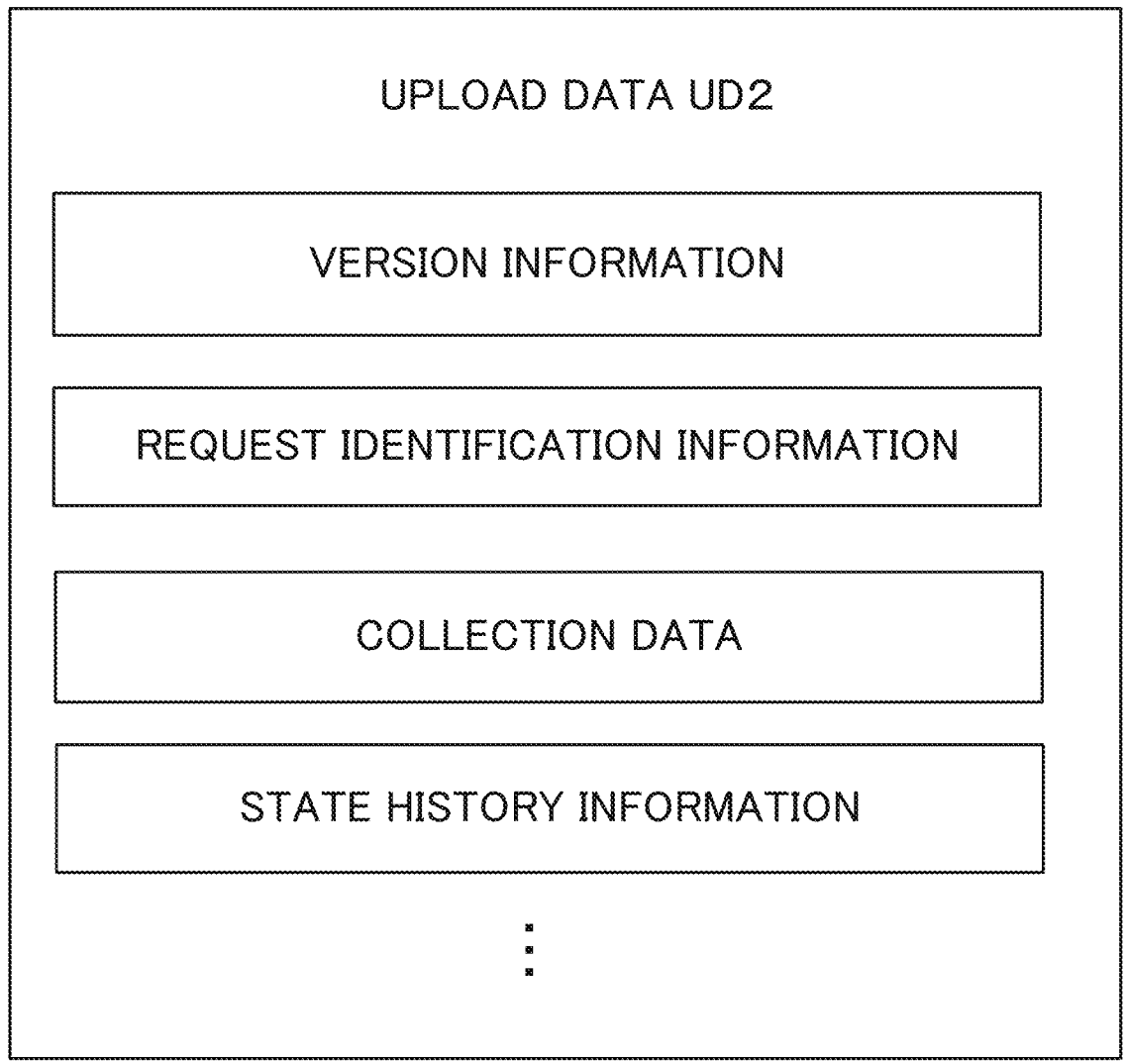
FIG. 15 illustrates an example of a data structure of upload data according to the second embodiment.

FIG. 15 is an example of the data structure of the upload data UD2 according to the second embodiment. As illustrated in FIG. 15, the upload data UD2 according to the second embodiment includes the "state history information" instead of the state count information. When the valid state management flag Fs is included in the corresponding job request JR2, the in-vehicle terminal 20 transmits, to the vehicle cloud server 30, the upload data UD2 including the state history information corresponding to the job, together with the collection data that is the execution result of the job requested by the job request JR2. Thus, the vehicle cloud server 30 that has received the upload data UD2 can preferably calculate the number of inactive transitions and the number of active transitions of the in-vehicle terminal 20 that is the transmission source of the upload data UD2 by referring to the state history information. The state history information is an example of "count information".

Figure 16:
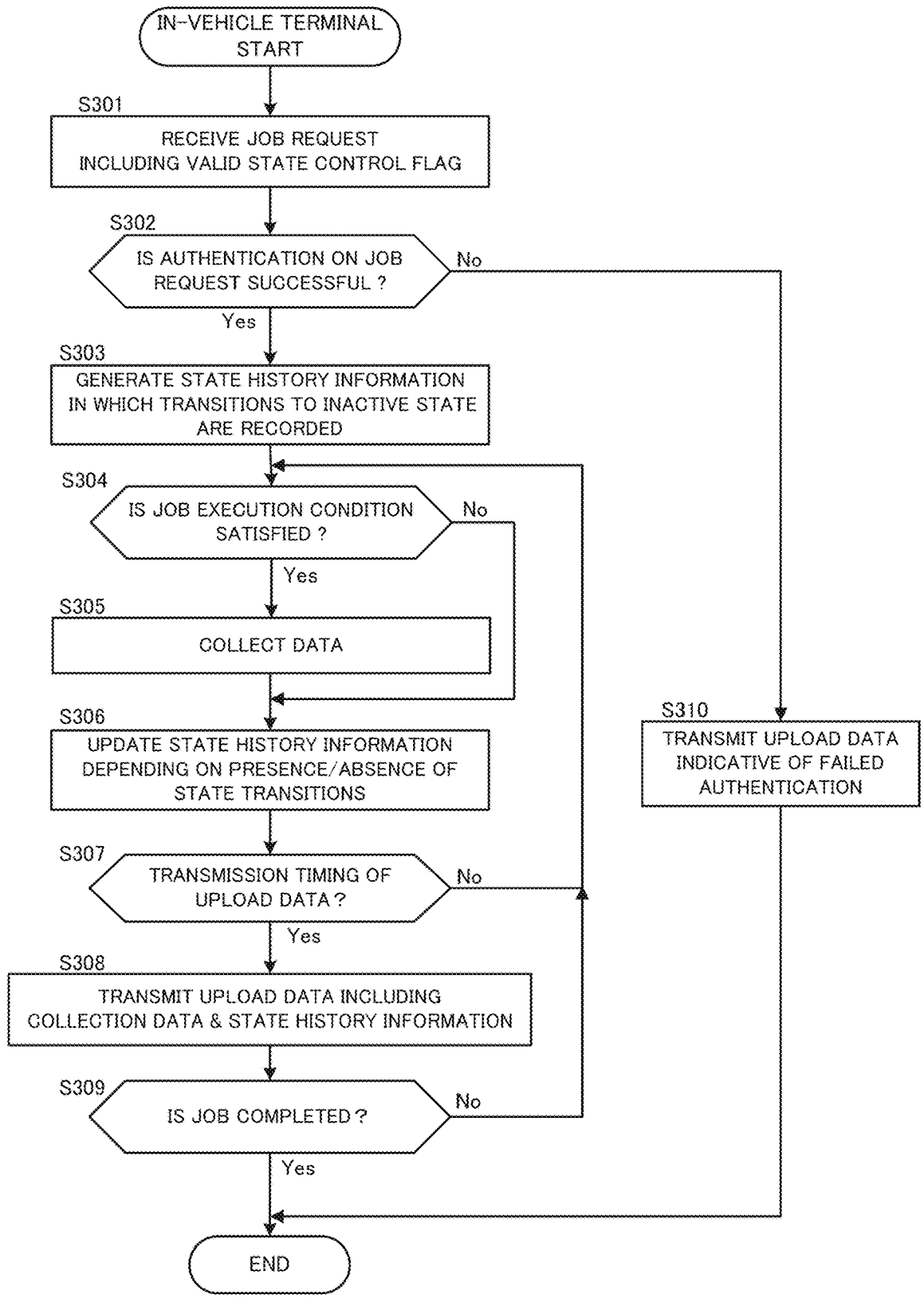
FIG. 16 is a flowchart showing a processing procedure executed by an in-vehicle terminal according to the second embodiment when the in-vehicle terminal receives a job request including a valid state management flag.

FIG. 16 is a flowchart illustrating a processing procedure executed by the in-vehicle terminal 20 according to the second embodiment when receiving the job request JR2 including the valid state management flag Fs. The in-vehicle terminal 20 repeatedly executes the processing of the flowchart shown in FIG. 16.

The in-vehicle terminal 20 receives the job request JR2 including the valid state management flag Fs from the vehicle cloud server 30 (step S301), and when the authentication process of the received job request JR2 is successful (step S302; Yes), generates the state history information for the job requested by the job request JR2 (step S303). In this case, since the job state is automatically set to the inactive state, the in-vehicle terminal 20 generates the state history information in which the transition to the inactive state is recorded.

When the execution condition of the job indicated by the "data collection condition information" included in the received job request JR2 is satisfied (step S304; Yes), the in-vehicle terminal 20 collects the data specified by the "collection data designation information" included in the job request JR2 using the data outputted by the sensor unit 27 (step S305). In this case, the job state of the job goes to the active state. On the other hand, when it is determined that the execution condition of the job is not satisfied (step S304; No), the in-vehicle terminal 20 proceeds with the process at step S306 without performing the process of step S305. In this case, the state of the job is in the inactive state.

Next, the in-vehicle terminal 20 updates the state history information depending on the presence/absence of transitions in the job state (step S306). Specifically, when determining, with reference to the latest job state indicated by the state history information, that the current job state has transitioned from the inactive state to the active state, the in-vehicle terminal 20 adds a record indicating the transition to the active state to the state history information for the target job. When determining that the state has transitioned from the active state to the inactive state, the in-vehicle terminal 20 adds a record indicating the transition to the inactive state to the state history information for the target job.

Thereafter, as in the first embodiment, when it is the transmission timing of the upload data UD2 (step S307; Yes), the in-vehicle terminal 20 transmits the upload data UD2 (see FIG. 15) including the collection data and the state history information collected at step S305 to the vehicle cloud server 30 (step S308). Further, when it is determined that the job is completed (step S309; Yes), the in-vehicle terminal 20 ends the process of the flowchart. On the other hand, if it is not the timing of sending the upload data UD2

(step S307; No), or if the job has not ended (step S309; No), the in-vehicle terminal 20 returns the process to the step S304.

Figure 17:
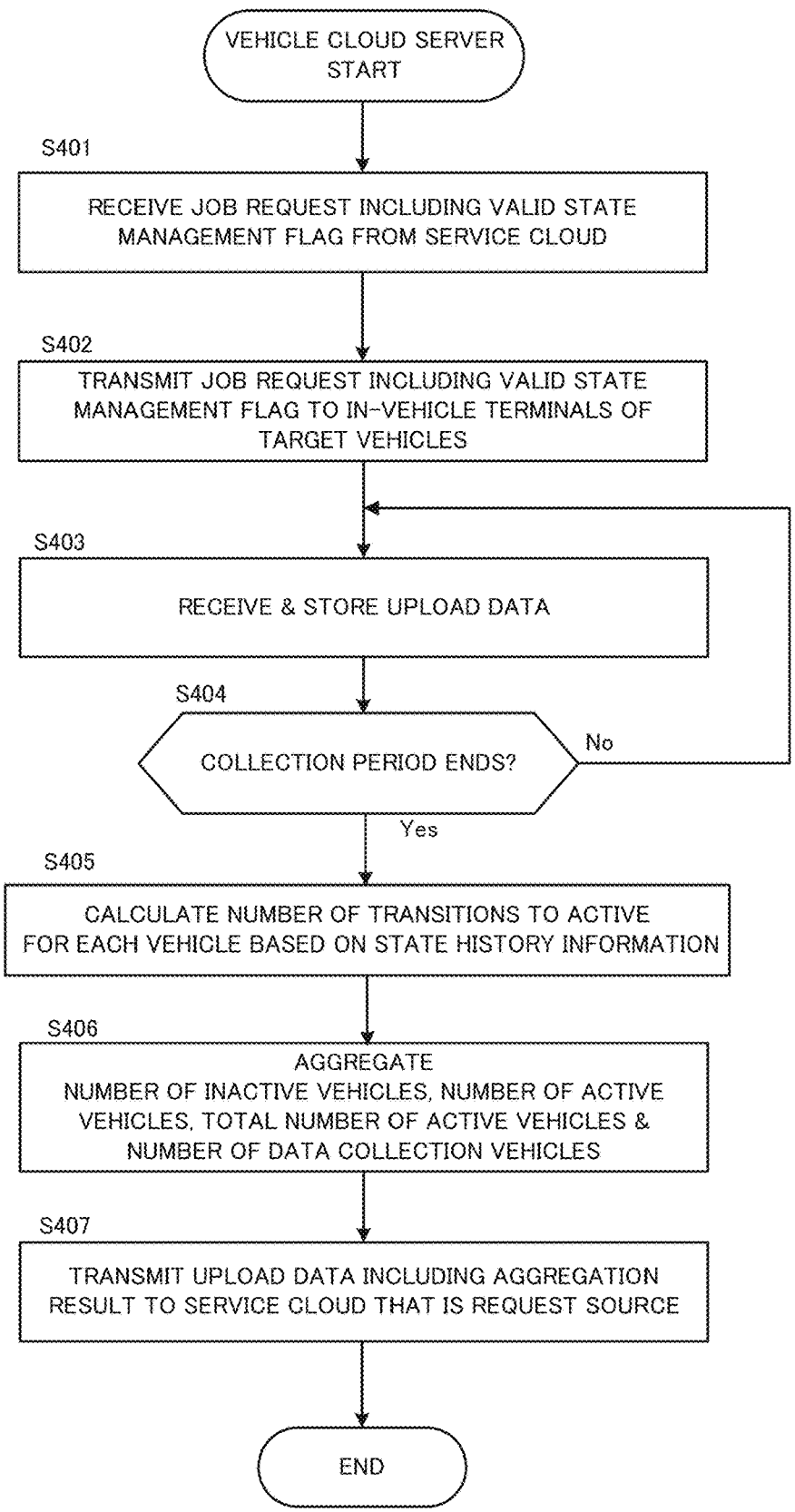
FIG. 17 is a flowchart illustrating a processing procedure executed by a vehicle cloud server according to the second embodiment in which the vehicle cloud server receives a job request including a valid state management flag.

FIG. 17 illustrates a flowchart of a processing procedure performed by the vehicle cloud server 30 according to the second embodiment when the vehicle cloud server 30 receives the job request JR1 including the valid state management flag Fs.

First, the vehicle cloud server 30 receives a job request JR1 containing a valid state management flag Fs from the service cloud server 40 (step S401). Then, the vehicle cloud server 30 refers to the vehicle information stored in the storage unit 32 and transmits the job request JR2 generated based on the job request JR1 to the in-vehicle terminal 20 of the vehicle managed by the vehicle cloud server 30 (step S402).

After that, the vehicle cloud server 30 receives the upload data UD2 including the state history information from the in-vehicle terminal 20 and stores it on the storage unit 32 (step S403). Then, the vehicle cloud server 30 repeatedly receives and stores the upload data UD2 according to the step S403 while step S404 is NO, i.e., until the predetermined collection period of the upload data UD2 ends.

When it is determined that the collection period of the upload data UD2 has ended (Step S404; Yes), the vehicle cloud server 30 calculates the number of active transitions for each vehicle, etc., based on the state history information included in the upload data UD2 received and stored at step S403 (Step S405). In this case, in addition to the number of active transitions, the vehicle cloud server 30 may also calculate the number of inactive transitions or the like based on the state history information. When the upload data UD2 related to the same job from the same in-vehicle terminal 20 is received more than once, the vehicle cloud server 30 may perform the above-described calculation based on the state history information included in the last-received upload data UD2.

Then, the vehicle cloud server 30 aggregates (totalizes) the number of inactive vehicles, the number of active vehicles, the total number of active vehicles, the number of data-collecting vehicles, and the like (step S406). For example, the vehicle cloud server 30 calculates the number of active vehicles and the total number of active vehicles based on the number of active transitions for each vehicle calculated at step S405. Further, the vehicle cloud server 30 calculates the number of inactive vehicles based on either the transmission history information Ih or the number of inactive transitions calculated at the step S405. Further, the vehicle cloud server 30 also calculates the number of data collection vehicles by counting the in-vehicle terminals 20 that are the transmission sources of the upload data UD2 including the collection data.

Next, the vehicle cloud server 30 transmits the upload data UD1 (see FIG. 9) including the aggregated result at step S405 to the service cloud server 40 that is the request source of the job request JR1 (step S407). Subsequently, the service cloud server 40 that generated the job request JR1 receives the upload data UD1 from the vehicle cloud server 30. In this case, on the basis of the received upload data UD1, the service cloud server 40 determines the reliability of the returned collection data, determines the validity of the data collection request and determines the cost-efficiency.

Third Example

In place of the state count information or the state history information, the in-vehicle terminal 20 according to the third embodiment transmits information (simply referred to as "state information") indicating the current job state to the vehicle cloud server 30. Hereafter, the configuration of the service cloud server 40, the data structures of the job requests JR1 and JR2, the data structure of the upload data UD1, and the like are the same as those of the first and second embodiments, and thus will not be described.

Figure 18:
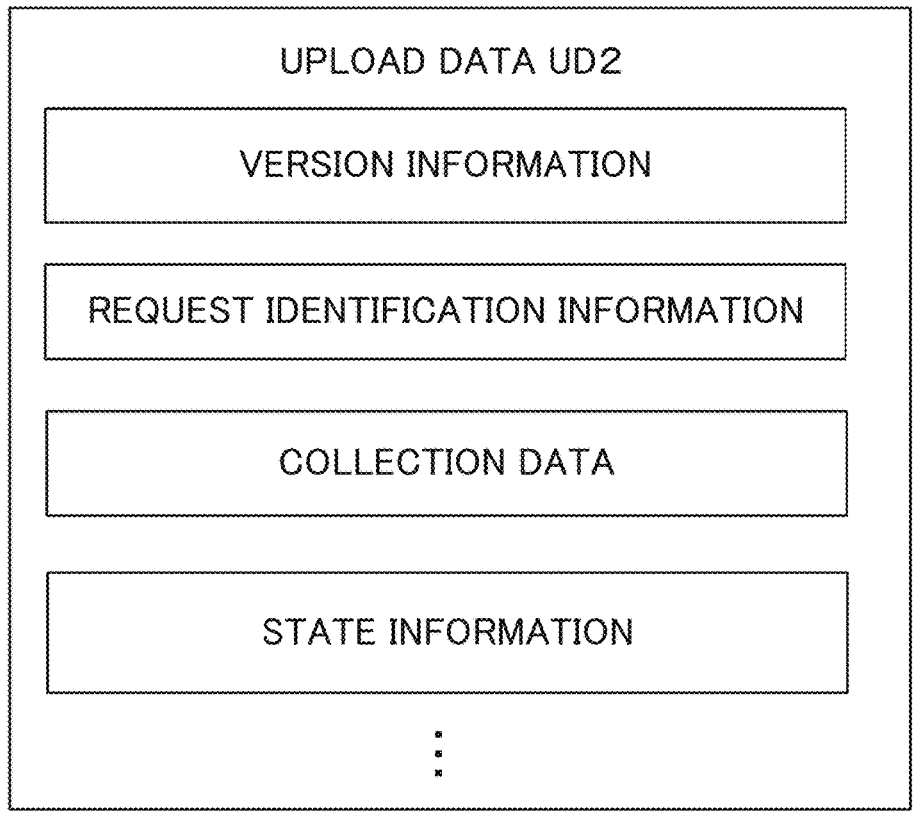
FIG. 18 illustrates an example of a data structure of upload data according to the third embodiment.

FIG. 18 is an example of the data structure of the upload data UD2 according to the third embodiment. As shown in FIG. 18, the upload data UD2 according to the third embodiment includes the "state information" instead of the state count information according to the first embodiment or the state history information according to the second embodiment.

When the valid state management flag Fs is included in the job request JR2, the in-vehicle terminal 20 transmits, to the vehicle cloud server 30, the upload data UD2 including the state information indicating the current job state corresponding to the job, together with the collection data that is the execution result of the job requested by the job request JR2. In this case, the in-vehicle terminal 20 transmits the upload data UD2 to the vehicle cloud server 30 at a time interval specified by the data collection condition information included in the job request JR2 received from the vehicle cloud server 30. In this case, the transmission timing of the upload data UD2 may be determined for each job or may be uniform among a plurality of jobs. The state information is an example of the "count information".

Figure 19:
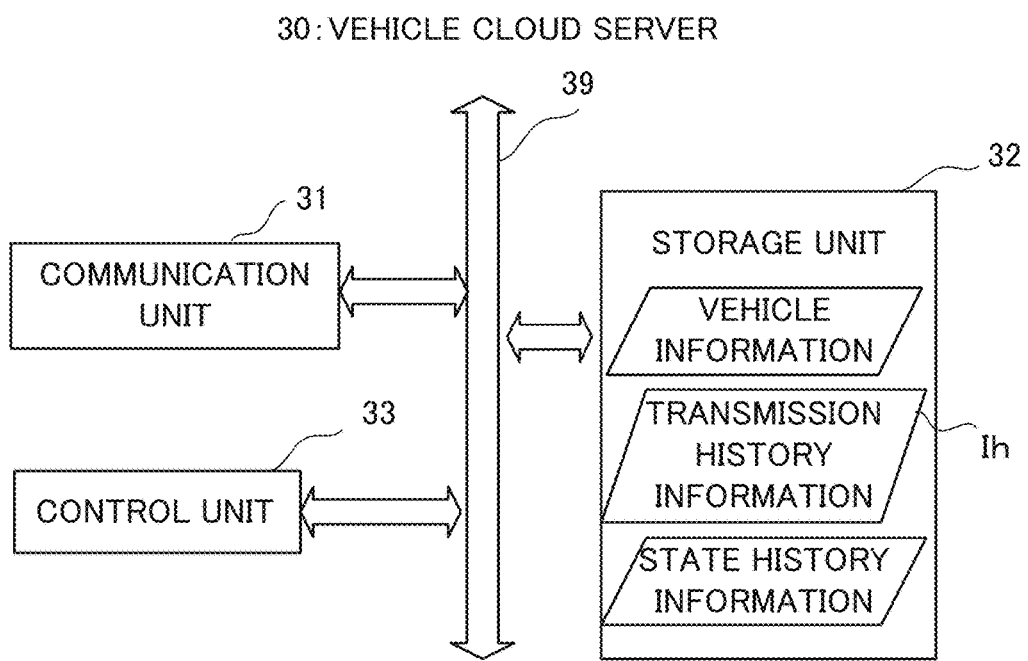
FIG. 19 schematically illustrates the internal configuration of a vehicle cloud server according to the third embodiment.

FIG. 19 is a diagram schematically illustrating the internal configuration of the vehicle cloud server 30 according to the third embodiment. As illustrated in FIG. 19, the vehicle cloud server 30 stores the state history information on the storage unit 32. Here, for example, the vehicle cloud server 30 generates the state history information for each job and for each vehicle ID based on the state information included in the upload data UD2 received from the in-vehicle terminal 20. In this case, for example, the state history information is information which associates, with respect to each request identification information and each vehicle ID, the job state indicated by the state information with the reception time or the generation time in the state information. By holding such state history information, the vehicle cloud server 30 can suitably perform the aggregation of the number of inactive vehicles, the number of active vehicles, the total number of active vehicles, the number of data collection vehicles and the like in the same way as the first embodiment and the second embodiment.

Figure 20:
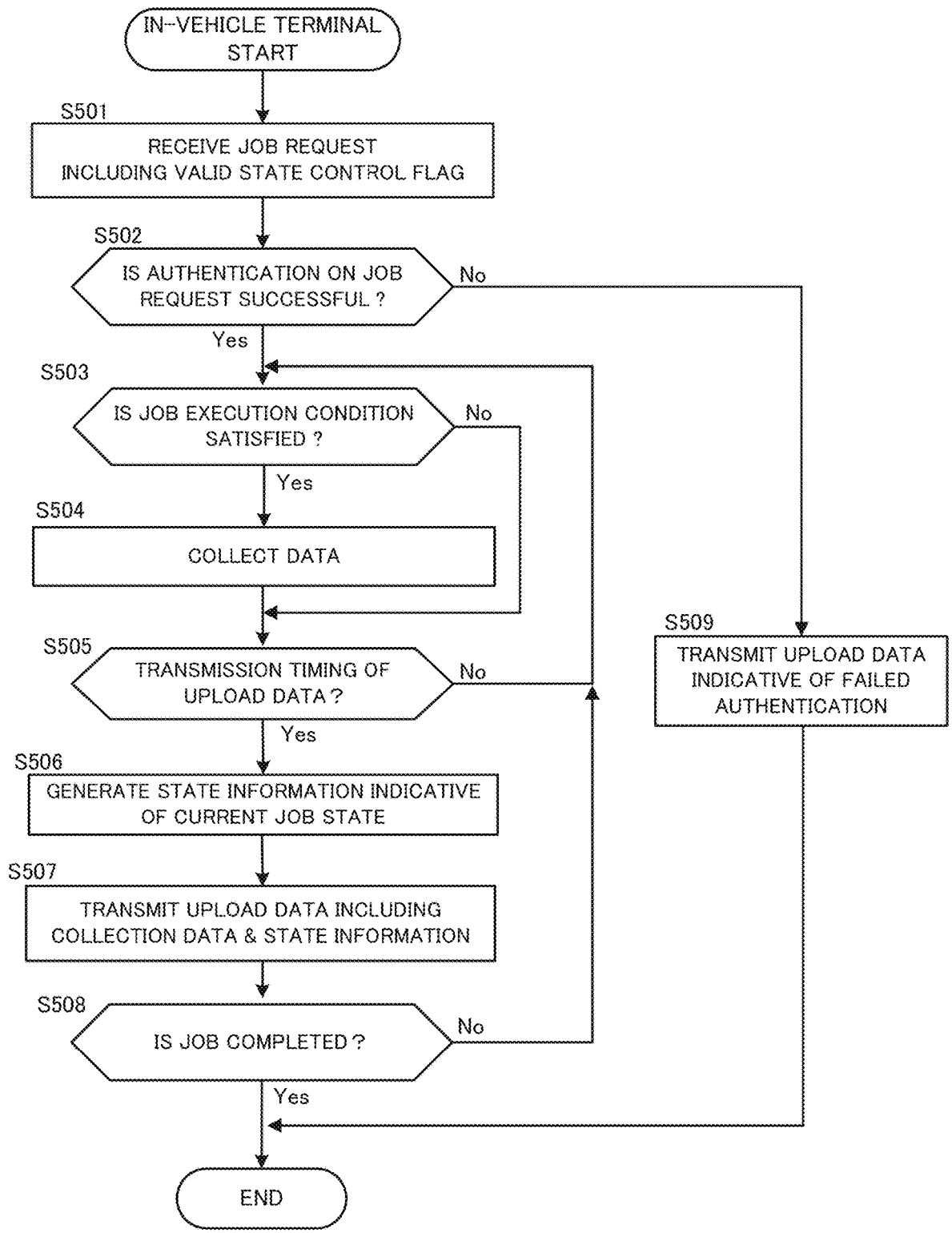
FIG. 20 illustrates a flowchart showing a processing procedure executed by an in-vehicle terminal according to the third embodiment when the in-vehicle terminal receives a job request including a valid state management flag.

FIG. 20 is a flowchart illustrating a processing procedure executed by the in-vehicle terminal 20 according to the third embodiment when the in-vehicle terminal 20 receives the job request JR2 including the valid state management flag Fs. The in-vehicle terminal 20 repeatedly executes the processing of the flowchart shown in FIG. 20.

When the in-vehicle terminal 20 receives the job request JR2 including the valid state management flag Fs from the vehicle cloud server 30 (step S501) and the authentication process of the received job request JR2 is successful (step S502; Yes), it determines whether or not the execution condition of the job indicated by the received job request JR2 is satisfied (step S503). When the execution condition of the job is satisfied (step S503; Yes), the in-vehicle terminal 20 collects the data specified by the job request JR2 using the data output by the sensor unit 27 (step S504). On the other hand, when it is determined that the execution condition of the job is not satisfied (step S503; No), the in-vehicle terminal 20 process proceeds with step S505 without performing the process at step S504.

Next, the in-vehicle terminal 20 determines whether or not it is the transmission timing of the upload data UD2 (step S505). In this case, the transmission timing of the upload data UD2 may be determined for each job or may be uniform among a plurality of jobs. Then, when it is the transmission timing of the upload data UD2 (step S505; Yes), the in-vehicle terminal 20 generates state information indicating the present job state (step S505). Specifically, the in-vehicle terminal 20 generates state information indicating that the job is in the inactive state when the execution condition of the job is not satisfied, and generates state information indicating that the job is in the active state when the execution condition of the job is satisfied.

Then, the in-vehicle terminal 20 transmits the upload data UD2 including the state information generated at step S506 and the collection data collected at the step S504 to the vehicle cloud server 30 (step S507). Then, when it is determined that the job should be terminated (step S508; Yes), the in-vehicle terminal 20 ends the process of the flowchart.

On the other hand, when it is not the transmission timing of the upload data UD2 (step S505; No), or when the job is not completed (step S508; No), the in-vehicle terminal 20 returns the process to the step S503. Thus, the in-vehicle terminal 20 repeatedly executes the process at step S503 to the step S507 until the expiration date of the job ends.

Figure 21:
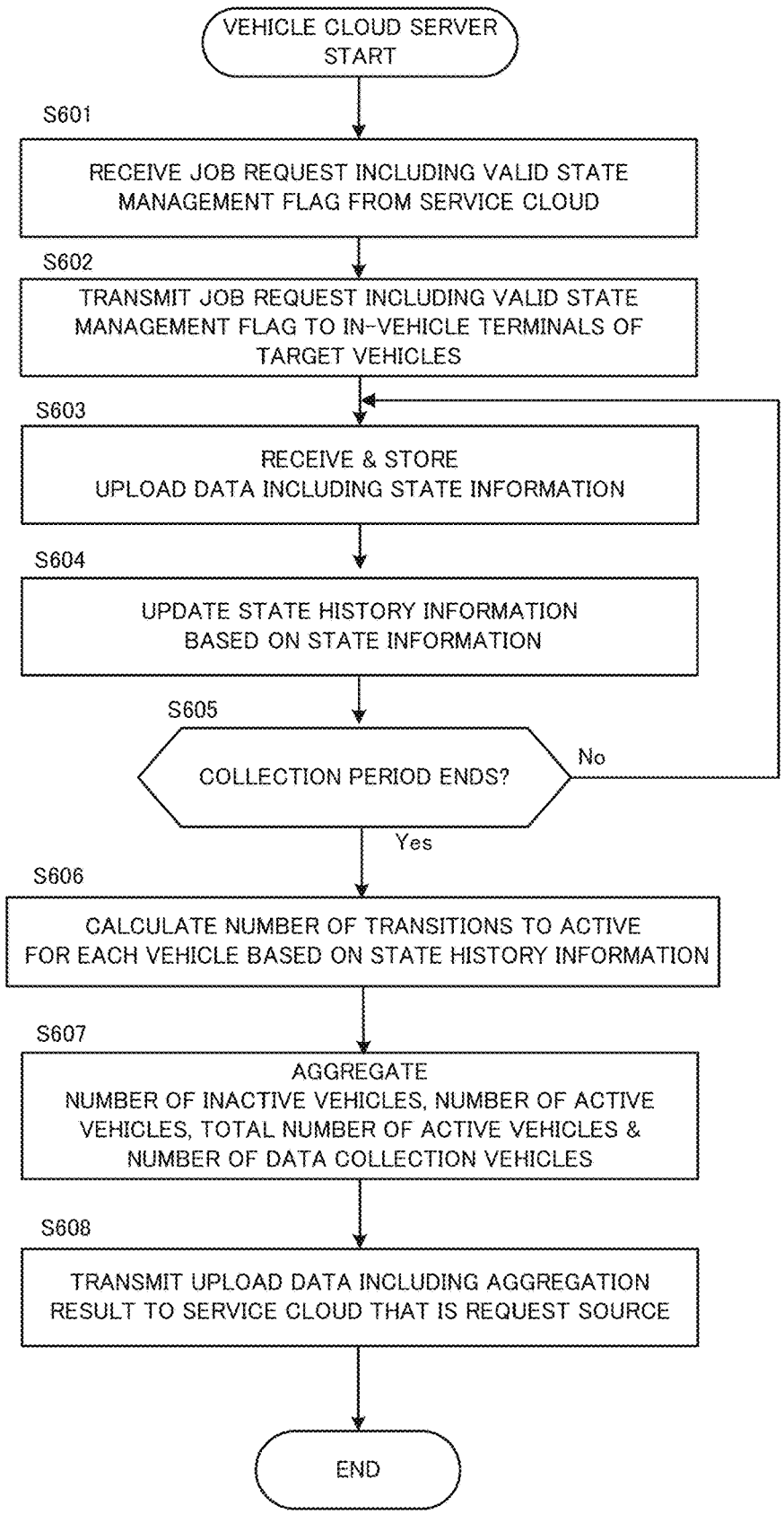
FIG. 21 illustrates a flowchart illustrating a processing procedure executed by a vehicle cloud server according to the third embodiment when the vehicle cloud server receives a job request including a valid state management flag.

FIG. 21 illustrates a flowchart showing a processing procedure executed by the vehicle cloud server 30 according to the third embodiment when the vehicle cloud server 30 receives the job request JR1 including the valid state management flag Fs.

First, the vehicle cloud server 30 receives a job request JR1 containing a valid state management flag Fs from the service cloud server 40 (step S601). Then, the vehicle cloud server 30 refers to the vehicle information stored on the storage unit 32 and transmits the job request JR2 generated based on the job request JR1 to the in-vehicle terminal 20 of the vehicle managed by the vehicle cloud server 30 (step S602).

Then, the vehicle cloud server 30 receives the upload data UD2 including the state information from the in-vehicle terminal 20 and stores it on the storage unit 32 (step S603). The vehicle cloud server 30 updates the state history information corresponding to the job and the vehicle ID indicated by the received upload data UD2 (step S604). For example, the vehicle cloud server 30 adds, to the target state history information, a record including the time information and the job state indicated by the state information of the received upload data UD2. Then, the vehicle cloud server 30 repeatedly performs step S603 and the step S604 until the predetermined collection period of the upload data UD2 ends (step S605; No).

When it is determined that the collection period of the upload data UD2 has ended (Step S605; Yes), the vehicle cloud server 30 computes the number of active transitions for each vehicle and the like based on the state history information stored on the storage unit 32 (Step S606). In this case, in addition to the number of active transitions, the vehicle cloud server 30 may also calculate the number of inactive transitions or the like based on the state history information.

Then, the vehicle cloud server 30 aggregates (totalizes) the number of inactive vehicles, the number of active vehicles, the total number of active vehicles, the number of data collection vehicles, and the like (step S607). For example, the vehicle cloud server 30 calculates the number of active vehicles and the total number of active vehicles based on the number of active transitions for each vehicle calculated at step S605. Further, the vehicle cloud server 30 calculates the number of inactive vehicles based on either the transmission history information Ih or the number of inactive transitions calculated at step S605. Further, the vehicle cloud server 30 calculates the number of data collection vehicles by counting the in-vehicle terminals 20 that are the transmission source of the upload data UD2 including the collection data.

Next, the vehicle cloud server 30 transmits the upload data UD1 (see FIG. 9) including the aggregated result at the step S605 to the service cloud server 40 that is the request source of the job request JR1 (step S608). Subsequently, the service cloud server 40 that generated the job request JR1 receives the upload data UD1 from the vehicle cloud server 30. In this case, on the basis of the received upload data UD1, the service cloud server 40 determines the reliability of the returned collection data, determines the validity of the data collection request, and determines the cost-efficiency.

As described above, the vehicle cloud server 30 receives the job request JR1 transmitted by the service cloud server 40 and transmits the job request JR2 based on the job request JR1 to the in-vehicle terminals 20 corresponding to a plurality of vehicles. Further, the vehicle cloud server 30 receives the upload data UD2 which is a reception result indicating that the in-vehicle terminals 20 of the vehicles have successfully received the job request JR2, and counts, on the basis of the upload data UD2, the number of inactive vehicles which is the number of vehicles that have successfully received the job request JR2. In addition, the vehicle cloud server 30 receives the upload data UD2 in which the number of active transitions of a job is one or more, and counts the number of active vehicles and the total number of active vehicles representing the number of vehicles that transmitted the upload data UD2. Then, the vehicle cloud server 30 transmits the upload data UD1 including the information on the number of inactive vehicles, the number of active vehicles, and the total number of active vehicles to the service cloud server 40.

As described above, the vehicle cloud server 30 receives the job request JR1 issued by the service cloud server 40. The vehicle cloud server 30 generates a job request JR2 including: data collection condition information and collection data designation information corresponding to the job request JR1; and a state management flag Fs indicating that the state count information or the state history information or the state information for counting the number of active transitions, wherein the number of active transitions is the number of times the state of the job, indicated by the data collection condition information and the collection data designation information, becomes in an active state in which the job is executed when the predetermined condition is satisfied. Then, the vehicle cloud server 30 transmits a job request JR2 to the in-vehicle terminals 20 of the plurality of vehicles. The vehicle cloud server 30 then receives upload data UD2 containing the collection data for the job request JR2 and the state count information or the state history information or the state information, and counts, based on the state count information, the state history information or the state information, at least one of the numbers of active vehicles or the total number of active vehicles. The vehicle cloud server 30 then transmits an upload data UD1 based on the counting results to the service cloud server 40.

Modification

Next, a modification suitable for the first to third embodiments described above will be described. The following modifications may be applied to the embodiments described above in arbitrary combination.

First Modification

In the first to third embodiments, a function corresponding to the in-vehicle terminal 20 may be incorporated in the vehicle V. In this case, the electronic control unit (ECU: Electronic Control Unit) of the vehicle, by executing a program stored on the memory of the vehicle, executes the process corresponding to the control unit 24 of the in-vehicle terminal 20. In this case, the vehicle V is an example of the "moving body", the electronic control unit of the vehicle V is an example of the "terminal device".

Second Modification

The state count information according to the first embodiment includes information on the number of inactive transitions. Instead, the state count information does not need to include information on the number of inactive transitions.

In this case, at step S103 and step S106 of FIG. 10, the in-vehicle terminal 20 counts only the number of active transitions, and includes the counted information on the number of active transitions in the upload data UD2 to transmit the upload data UD2 to the vehicle cloud server 30. In this case, at step S205 in FIG. 11, the vehicle cloud server 30 calculates the number of inactive vehicles based on the transmission history information Ih. Further, the vehicle cloud server 30 calculates the number of data collection vehicles by counting the number of the in-vehicle terminals 20 serving as the transmission source of the upload data UD2.

Similarly, the state history information of the second embodiment may not include information on the transition to the inactive state. In this case as well, the vehicle cloud server 30 that has received the upload data UD2 including the state history information may calculate the number of inactive vehicles based on the transmission history information Ih at step S406 in FIG. 17.

Third Modification

In the first embodiment, the in-vehicle terminal 20 may generate the state count information from the state history information at the time of sending the upload data UD2 and include the state count information in the upload data UD2. In this case, the in-vehicle terminal 20 stores the state history information on the storage unit 22 as illustrated in FIG. 14. The in-vehicle terminal 20 generates the state count information by referring to the state history information stored on the storage unit 22 at the transmission timing of the upload data UD2, and transmits the state count information to the vehicle cloud server 30 as upload data UD2 together with the collection data and the like.

Fourth Modification

In the first to third embodiments, there may be a plurality of jobs included in the job requests JR1 and JR2. In this case, common execution conditions may be set for multiple jobs, or different execution conditions may be set for each job. If different execution conditions are set for each job, the job has individual job states. For example, job(s) that satisfy the execution condition individually transit from the inactive state to the active state.

Fifth Modification

In the first to third embodiments, the vehicle cloud server 30 may generate ratio information indicating: the ratio of the number of active vehicles to the number of inactive vehicles; or the ratio of the number of data collection vehicles to the number of inactive vehicles, and may include the ratio information in the upload data UD1 and transmit the ratio information to the service cloud server 40. This allows the vehicle cloud server 30 to preferably transmit to the service cloud server 40 the information necessary to determine the effectiveness and cost efficiency of the data collection request. In this modification, the above-described ratio information is an example of the "moving body number information".

BRIEF DESCRIPTION OF REFERENCE NUMBERS

20 In-vehicle terminal
27 Sensor unit
30 Vehicle cloud server
40 Service cloud server

What is claimed is:

1. A moving body management device comprising:
a processor coupled to a memory storing instructions to permit the processor to function as:
a first receiving unit configured to receive a request signal transmitted by an information management device;
a generating unit configured to generate command information, which indicates a command to a moving body and which includes condition information indicative of a condition in which the moving body executes the command, based on the request signal;
a first transmitting unit configured to transmit the command information to a plurality of moving bodies;
a second receiving unit configured to receive a reception result indicating that the moving bodies have successfully received the command information;
a first counting unit configured to count, on a basis of the reception result, a number of the moving bodies which have successfully received the command information;
a third receiving unit configured to receive response information, which includes state count information associated with a number of transitions to a state of the command information, the state varying depending on whether or not the condition is satisfied, in response to the command information;
a second counting unit configured to count, on a basis of the response information, a number of the moving bodies that have transmitted the response information; and
a second transmitting unit configured to transmit moving body number information to the information management device, the moving body number information relating to the number of the moving bodies which have successfully received the command information and the number of the moving bodies that have transmitted the response information,
wherein the moving body is controlled based on the command information.

2. The moving body management device according to claim 1,
wherein the first transmitting unit transmits the command information and flag information to the plurality of the moving bodies, the flag information instructing transmission of information relating to the state of the command information.

3. The moving body management device according to claim 2,
wherein the state of the command information includes:
an execution state that is a state in which the condition is satisfied and the command is executed; and
a non-execution state that is a state in which the condition is not satisfied and the command is not executed, and
wherein the second transmitting unit transmits, to the information management device, information, as the moving body number information, indicating a ratio of a number of the moving bodies in which the command information becomes the execution state to the number of the moving bodies which have successfully received the command information.

4. The moving body management device according to claim 1, further comprising a memory which stores identification information of a moving body of the moving bodies to which the first transmitting unit transmits the command information, the identification information being associated with identification information of the command indicated by the command information.

5. The moving body management device according to claim 1, wherein the reception result includes fail information indicating that the command information was not accepted successfully.

6. A control method performed by a moving body management device, the control method comprising:
receiving a request signal transmitted by an information management device;
generating command information, which indicates a command to a moving body and which includes condition information indicative of a condition in which the moving body executes the command, based on the request signal;
transmitting the command information to a plurality of moving bodies;
receiving a reception result indicating that the moving bodies have successfully received the command information;
counting, on a basis of the reception result, a number of the moving bodies which have successfully received the command information;
receiving response information, which includes state count information associated with a number of transitions to a state of the command information, the state varying depending on whether or not the condition is satisfied, in response to the command information;
counting, on a basis of the response information, a number of the moving bodies that have transmitted the response information; and
transmitting moving body number information to the information management device, the moving body number information relating to the number of the moving bodies which have successfully received the command information and the number of the moving bodies that have transmitted the response information,
wherein the moving body is controlled based on the command information.

7. A non-transitory computer readable medium including instructions executed by a computer, the instructions comprising:
receiving a request signal transmitted by an information management device;
generating command information, which indicates a command to a moving body and which includes condition information indicative of a condition in which the moving body executes the command, based on the request signal;
transmitting the command information to a plurality of moving bodies;
receiving a reception result indicating that the moving bodies have successfully received the command information;
counting, on a basis of the reception result, a number of the moving bodies which have successfully received the command information;
receiving response information, which includes state count information associated with a number of transitions to a state of the command information, the state varying depending on whether or not the condition is satisfied, in response to the command information;
counting, on a basis of the response information, a number of the moving bodies that have transmitted the response information; and
transmitting moving body number information to the information management device, the moving body number information relating to the number of the moving bodies which have successfully received the command information and the number of the moving bodies that have transmitted the response information,
wherein the moving body is controlled based on the command information.

* * * * *